United States Patent
Kim et al.

(10) Patent No.: US 11,284,026 B2
(45) Date of Patent: Mar. 22, 2022

(54) IMAGE SENSOR

(71) Applicant: SAMSUNG ELECTRONICS CO., LTD., Suwon-si (KR)

(72) Inventors: Kyung-Min Kim, Seoul (KR); Heesung Chae, Seoul (KR); Jaeyoung Bae, Seoul (KR); Sukki Yoon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 86 days.

(21) Appl. No.: 16/906,185

(22) Filed: Jun. 19, 2020

(65) Prior Publication Data

US 2021/0084245 A1  Mar. 18, 2021

(30) Foreign Application Priority Data

Sep. 16, 2019 (KR) .................. 10-2019-0113643

(51) Int. Cl.
| | |
|---|---|
| *H04N 5/357* | (2011.01) |
| *H04N 5/378* | (2011.01) |
| *H04N 5/374* | (2011.01) |
| *H04N 5/361* | (2011.01) |
| *G09G 3/20* | (2006.01) |

(Continued)

(52) U.S. Cl.
CPC ........... *H04N 5/357* (2013.01); *H04N 3/1568* (2013.01); *H04N 5/37455* (2013.01); *H04N 5/378* (2013.01)

(58) Field of Classification Search
CPC .. H04N 5/357; H04N 5/37455; H04N 3/1568; H04N 5/378; H04N 5/3577; H04N 5/361; H04N 5/374; G09G 3/2048; G09G 2320/029; G09G 2320/0295

See application file for complete search history.

(56) References Cited

U.S. PATENT DOCUMENTS

| | | | |
|---|---|---|---|
| 6,046,466 A | * | 4/2000 | Ishida ................... H01L 27/146 257/258 |
| 7,408,138 B2 | | 8/2008 | Lee |
| 8,477,384 B2 | | 7/2013 | Mizuguchi et al. |

(Continued)

FOREIGN PATENT DOCUMENTS

| | | |
|---|---|---|
| JP | 2012-235283 A | 11/2012 |
| KR | 10-0735726 B1 | 7/2007 |

(Continued)

*Primary Examiner* — Marly S Camargo
(74) *Attorney, Agent, or Firm* — Sughrue Mion, PLLC

(57) ABSTRACT

An image sensor compensates for noise. The image sensor includes a pixel array that includes a common monitor output line, a first monitoring pixel outputting a first monitoring signal, a second monitoring pixel outputting a second monitoring signal, and an active pixel configured to output a sensing signal based on an incident light. The image circuit also includes a binning circuit that receives the first and second monitoring signals through the common monitor output line and generates an average monitoring signal by performing binning on the first and second monitoring signals, and an analog-to-digital converter that detects an alternating current (AC) component of the average monitoring signal and couples the sampled AC component of the average monitoring signal to the sensing signal, thereby compensating for noise.

20 Claims, 14 Drawing Sheets

(51) Int. Cl.
     *H04N 3/14*           (2006.01)
     *H04N 5/3745*       (2011.01)

(56) References Cited

U.S. PATENT DOCUMENTS

| | | | |
|---|---|---|---|
| 9,111,825 B2 | 8/2015 | Kai | |
| 9,300,953 B2* | 3/2016 | Park | H04N 9/64 |
| 10,154,213 B2 | 12/2018 | Yan | |
| 2006/0244699 A1* | 11/2006 | Yamazaki | 345/82 |
| 2009/0058776 A1* | 3/2009 | Tomohiro | G09G 3/3655 |
| | | | 345/87 |
| 2009/0109313 A1* | 4/2009 | Liu | H04N 5/32 |
| | | | 348/308 |
| 2009/0128527 A1* | 5/2009 | Itakura | G09G 5/00 |
| | | | 345/205 |
| 2014/0240569 A1 | 8/2014 | Yang et al. | |
| 2017/0359492 A1 | 12/2017 | Cho et al. | |
| 2019/0007632 A1 | 1/2019 | Kim et al. | |
| 2019/0253650 A1* | 8/2019 | Kim | H04N 5/357 |
| 2020/0314375 A1* | 10/2020 | Nishino | H04N 5/369 |

FOREIGN PATENT DOCUMENTS

| | | |
|---|---|---|
| KR | 10-2014-0107045 A | 9/2014 |
| KR | 10-2018-0085349 A | 7/2018 |

\* cited by examiner

IMAGE SENSOR

CROSS-REFERENCE TO RELATED APPLICATIONS

This application claims priority under 35 U.S.C. § 119 to Korean Patent Application No. 10-2019-0113643 filed on Sep. 16, 2019, in the Korean Intellectual Property Office, the disclosures of which are incorporated by reference herein in their entireties.

BACKGROUND

Embodiments of the disclosure described herein relate to an image sensor, and more particularly, relate to an image sensor to compensate for a pixel coupling noise and a power noise.

A complementary metal-oxide semiconductor (CMOS) image sensor is a solid state pickup device (or a solid state imaging device) using complementary metal-oxide semiconductor. Compared to a CCD image sensor having a high voltage analog circuit, the CMOS image sensor is advantageous in that manufacturing costs are low and the size of a component is small (i.e., power consumption is small). Also, as the performance of the CMOS image sensor is being improved, the CMOS image sensor is being mounted on home appliances as well as portable devices such as a smartphone and a digital camera.

Nowadays, with an increasing demand on the CMOS image sensor, there are being developed technologies for improving the quality of an image that the CMOS image sensor generates. In particular, because various noises that occur in internal components of the CMOS image sensor in an operation of the CMOS image sensor reduce the quality of image, there may be a demand on removing the noises. In particular, there is a demand on a technology for compensating for a pixel coupling noise and a power noise of the CMOS image sensor.

SUMMARY

Embodiments of the disclosure provide an image sensor to compensate for a pixel coupling noise and a power noise.

Provided herein is an exemplary image sensor including a pixel array, the pixel array including a common monitor output line, a first monitoring pixel configured to output a first monitoring signal, a second monitoring pixel configured to output a second monitoring signal, and an active pixel configured to output a detection signal based on an incident light; a binning circuit configured to: receive the first and second monitoring signals through the common monitor output line, bin the first and second monitoring signals, and generate, based on the binned first and second monitoring signals, a first average monitoring signal; an analog-to-digital converter configured to: extract an alternating current (AC) component of the first average monitoring signal, and generate a compensation signal based on the AC component; and a buffer block configured to output image data based on the compensation signal.

Also provided herein is another exemplary image sensor, the another image sensor including a pixel array, the pixel array including: a common monitor output line, a plurality of monitoring pixels configured to output monitoring signals through the common monitor output line, and a plurality of active pixels; a binning circuit configured to: receive the monitoring signals through the common monitor output line, bin the monitoring signals, and generate, based on the binned monitoring signals, an average monitoring signal; an analog-to-digital converter including: a ramp signal generator, a ramp buffer, a correlated double sampling circuit, and a pixel bias circuit, wherein the analog-to-digital converter is configured to: extract an alternating current (AC) component of the average monitoring signal, and provide, under control of a control circuit, the AC component to at least one of the ramp signal generator, the ramp buffer, the correlated double sampling circuit, and the pixel bias circuit; and the control circuit configured to control the analog-to-digital converter.

Yet another exemplary image sensor is disclosed, the yet another image sensor including an active pixel configured to: detect an incident light, and generate a detection signal based on the detected incident light; a plurality of monitoring pixels configured to share a common monitor output line; a binning circuit configured to: receive monitoring signals from the plurality of monitoring pixels through the common monitor output line, bin the monitoring signals, generate, based on the binned monitoring signals, an average monitoring signal; a ramp signal generator configured to generate a ramp signal, wherein the ramp signal includes levels varying linearly over time; a ramp buffer configured to generate, based on the ramp signal, a reference signal; a pixel bias circuit configured to drive the active pixel so as to output the detection signal; a correlated double sampling circuit configured to: receive the detection signal and the reference signal, and to generate a compensation signal by performing, based on the reference signal, correlated double sampling on the detection signal; and a bias signal generator configured to: provide a first bias signal to the ramp signal generator, provide a second bias signal to the ramp buffer, and provide third and fourth bias signals to the pixel bias circuit, wherein at least one of the ramp signal generator, the ramp buffer, and the pixel bias circuit are configured to: receive the average monitoring signal, and sample an alternating current (AC) component of the average monitoring signal.

Also provide, according to an exemplary embodiment, an image sensor may include a pixel array that includes a common monitor output line, a first monitoring pixel configured to output a first monitoring signal, a second monitoring pixel configured to output a second monitoring signal, and an active pixel configured to output a detection signal based on an incident light, a binning circuit that receives the first and second monitoring signals through the common monitor output line and generates a first average monitoring signal by performing binning on the first and second monitoring signals, and an analog-to-digital converter that detects an alternating current (AC) component of the first average monitoring signal and couples the sampled AC component of the first average monitoring signal with the detection signal.

According to an exemplary embodiment, an image sensor may include a pixel array that includes a common monitor output line, a plurality of monitoring pixels configured to output monitoring signals through the common monitor output line, and a plurality of active pixels, a binning circuit that receives the monitoring signals through the common monitor output line and generates an average monitoring signal by performing binning on the monitoring signals, an analog-to-digital converter that includes a ramp signal generator, a ramp buffer, a correlated double sampling circuit, and a pixel bias circuit and detects an alternating current (AC) component of the average monitoring signal, and a control circuit that controls the analog-to-digital converter so as to provide the AC component of the average monitoring signal to at least one of the ramp signal generator, the ramp buffer, the correlated double sampling circuit, and the pixel bias circuit.

According to an exemplary embodiment, an image sensor may include an active pixel that detects an incident light and to generate a detection signal based on the detected incident light, a plurality of monitoring pixels that shares a common monitor output line, a binning circuit that generates an average monitoring signal by performing binning on monitoring signals received from the plurality of monitoring pixels through the common monitor output line, a ramp signal generator that generates a ramp signal having levels linearly varying over time, a ramp buffer that generates a reference signal based on the ramp signal, a pixel bias circuit that drives the active pixel so as to output the detection signal, a correlated double sampling circuit that receives the output detection signal and the reference signal and to generate a compensation signal by performing correlated double sampling on the detection signal based on the reference signal, and a bias signal generator that provides a first bias signal to the ramp signal generator, provides a second bias signal to the ramp buffer, and provides third and fourth bias signals to the pixel bias circuit. At least one of the ramp signal generator, the ramp buffer, and the pixel bias circuit may receive the average monitoring signal and may sample an AC component of the average monitoring signal.

BRIEF DESCRIPTION OF THE FIGURES

The above and other objects and features of the disclosure will become apparent by describing in detail exemplary embodiments thereof with reference to the accompanying drawings.

DETAILED DESCRIPTION

Below, embodiments of the disclosure will be described in detail and clearly to such an extent that an ordinary one in the art easily implements the disclosure.

Figure 1:
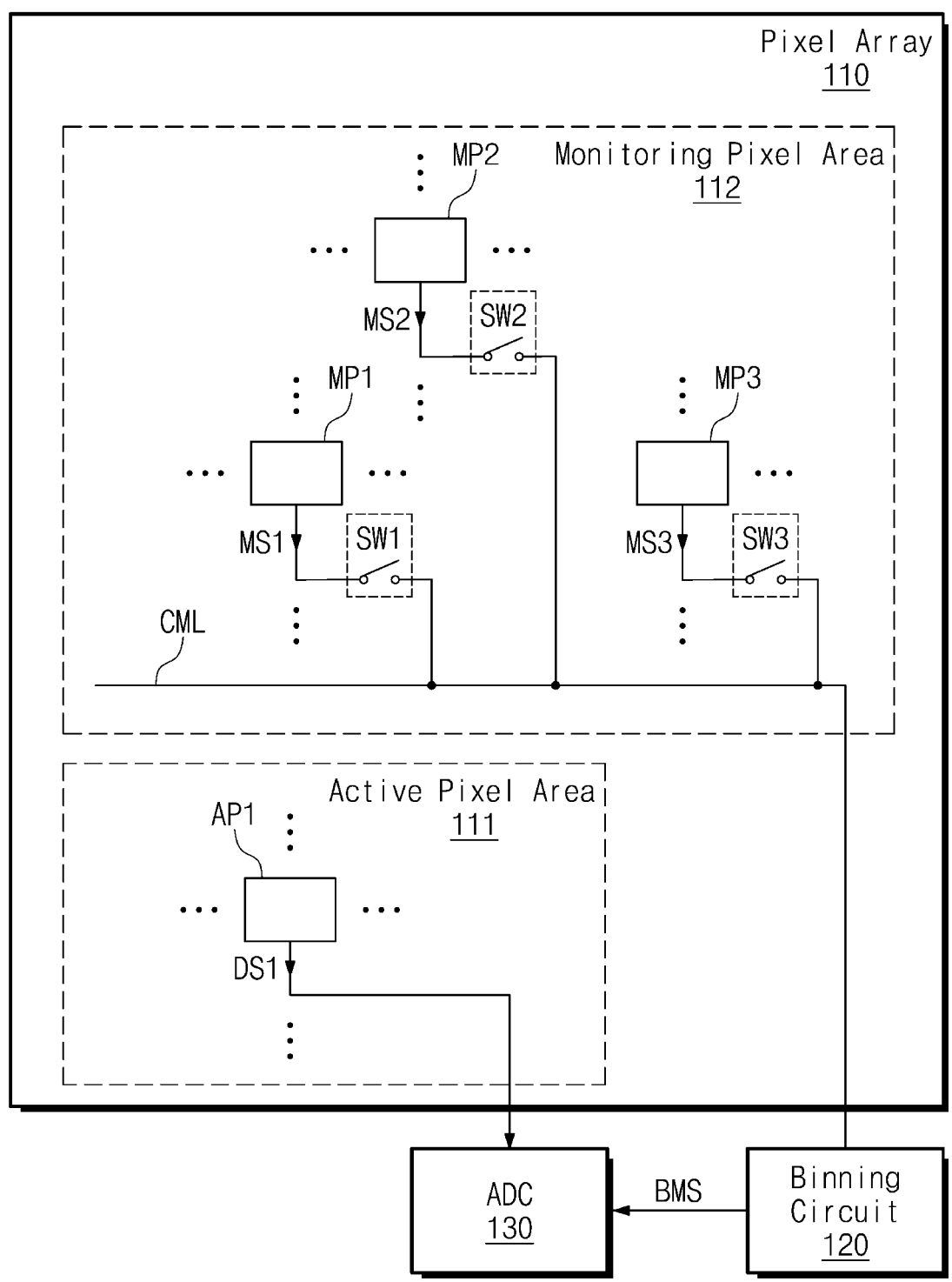
FIG. 1 is a block diagram illustrating an image sensor according to an embodiment of the disclosure.

FIG. 1 is a block diagram illustrating an image sensor according to an embodiment of the disclosure. An image sensor 100 may include a pixel array 110, a binning circuit 120, and an analog-to-digital converter (ADC) 130. The pixel array 110 may include an active pixel area 111 and a monitoring pixel area 112.

The active pixel area 111 may include an active pixel AP1. The active pixel AP1 may detect an incident light and may generate a detection signal DS1 based on the incident light. For example, the active pixel AP1 may be one of various pixels such as a red pixel to convert a light in a red spectrum domain into an electrical signal, a green pixel to convert a light in a green spectrum domain into an electrical signal, a blue pixel to convert a light in a blue spectrum domain into an electrical signal, and a depth pixel to convert depth information into an electrical signal by using a time of flight (TOF) manner.

The monitoring pixel area 112 may include monitoring pixels MP1 to MP3, a common monitor output line CML, switches SW1 to SW3 to selectively connect the monitoring pixels MP1 to MP3 to the common monitor output line CML, respectively. The monitoring pixels MP1 to MP3 may output monitoring signals MS1 to MS3, respectively. Each of the monitoring pixels MP1 to MP3 may be referred to as a "dark pixel (or photodiode-removed dark pixel)" blocked from an incident light. When the switches SW1 to SW3 electrically connect the monitoring pixels MP1 to MP3 to the common monitor output line CML, the monitoring pixels MP1 to MP3 may output the monitoring signals MS1 to MS3 through the common monitor output line CML, respectively. For example, the switches SW1 to SW3 may be implemented with a transistor, a diode, etc. The active pixel AP1 and the monitoring pixels MP1 to MP3 may be arranged in the form of a matrix including rows and columns in the pixel array 110, which will be described in FIG. 2.

The monitoring signals MS1 to MS3 output from the monitoring pixels MP1 to MP3 may include a coupling noise between pixels included in the pixel array 110, and a power noise (or a ground noise). The coupling noise between pixels may include a noise (e.g., a horizontal band noise (HBN)) of a fixed horizontal pattern, which occurs due to a coupling between adjacent pixels. The power noise (or ground noise) may refer to a noise included in power supply voltages (e.g., VDD and VSS).

The binning circuit 120 may receive the monitoring signals MS1 to MS3 through the common monitor output line CML. The binning circuit 120 may perform binning on the monitoring signals MS1 to MS3. The binning may include adding, summing or accumulating at least two of the monitoring signals MS1 to MS3 (e.g., currents or charges corresponding to the at least two of the monitoring signals MS1 to MS3). The binning circuit 120 may generate an average monitoring signal BMS from the binned monitoring signals MS1 to MS3. A level of the average monitoring signal BMS may be identical to an average level of levels of the monitoring signals MS1 to MS3.

The ADC 130 may receive the detection signal DS1. The ADC 130 may receive the average monitoring signal BMS from the binning circuit 120. The ADC 130 may detect, or extract, an alternating current (AC) component of the average monitoring signal BMS. Structures and operations of the ADC 130 may be described in detail below referring to FIGS. 5 through 8. The ADC 130 may sample the AC component of the average monitoring signal BMS. An operation of sampling the AC component of the average monitoring signal BMS may include an operation of removing a DC component of the average monitoring signal BMS. The ADC 130 may couple the detection signal DS1 with the sampled AC component of the average monitoring signal BMS. In one embodiment, ADC 130 may perform an analog-to-digital conversion based on the AC component of the average monitoring signal BMS.

For example, the coupling of the detection signal DS1 with the sampled AC component of the average monitoring signal BMS may include adding the detection signal DS1 and the sampled AC component of the average monitoring signal BMS, shifting a phase of the sampled AC component of the average monitoring signal BMS (e.g., as much as 180 degrees) to then add the phase-shifted AC component and the detection signal DS1, coupling (or adding) a reference signal (e.g., REF of FIG. 5 to be described later) to be compared with the detection signal DS1 in the ADC 130 and the sampled AC component of the average monitoring signal BMS, coupling (or adding) a ramp signal (e.g., RMP of FIG. 5 to be described later) to be used to generate the reference signal and the sampled AC component of the average monitoring signal BMS, and coupling (or adding) bias signals (e.g., VB1 to VB4 of FIG. 5 to be described later) to be supplied to the ADC 130 and the sampled AC component of the average monitoring signal BMS. As such, the ADC 130 may compensate for the coupling noise between pixels included in the detection signal DS1, and the power noise (or ground noise).

Figure 2:
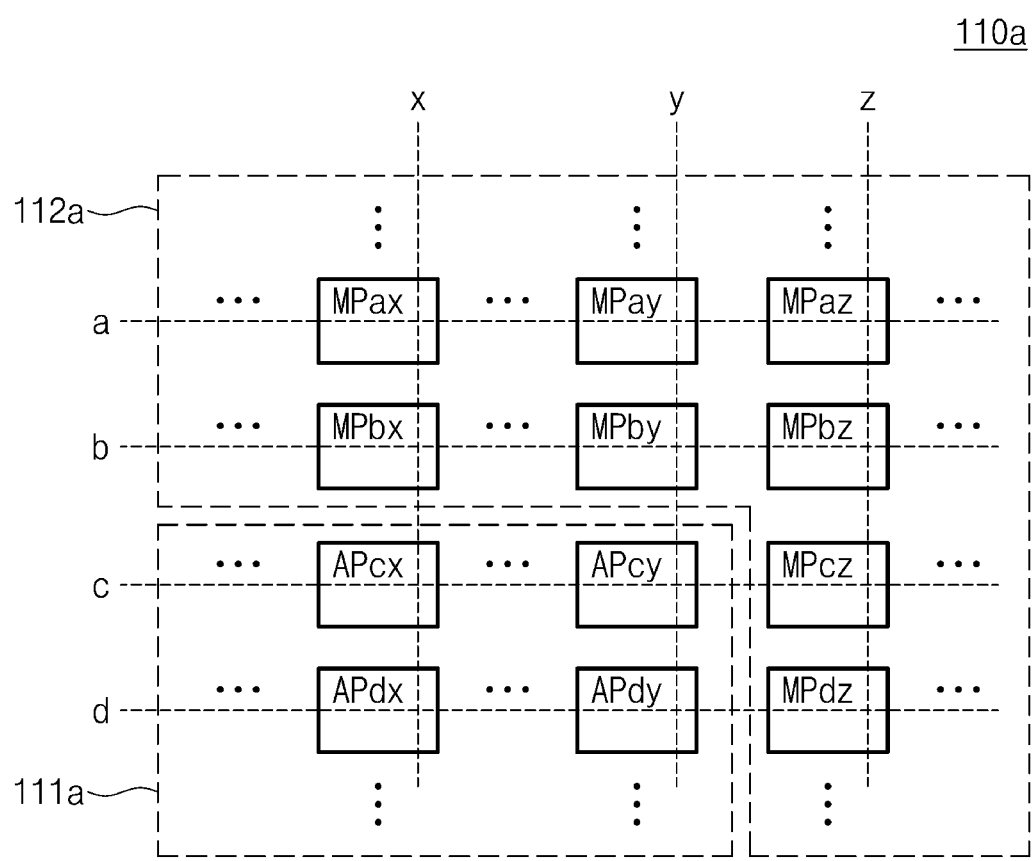
FIG. 2 is a block diagram illustrating a pixel array of FIG. 1.

FIG. 2 is a block diagram illustrating a pixel array of FIG. 1. FIG. 2 will be described with reference to FIG. 1. A pixel array 110a may include an active pixel area 111a and a monitoring pixel area 112a. The active pixel area 111a may include active pixels APcx, APcy, APdx, and APdy. The monitoring pixel area 112a may include monitoring pixels MPax, MPay, MPaz, MPbx, MPby, MPbz, MPcz, and MPdz.

The active pixels APcx, APcy, APdx, and APdy and the monitoring pixels MPax, MPay, MPaz, MPbx, MPby, MPbz, MPcz, and MPdz may be arranged in the form of a matrix including rows "a" to "d" and columns "x" to "z" in the pixel array 110a. The active pixels APcx, APcy, APdx, and APdy may be sequentially selected in the order of rows "a" to "d" for the readout of detection signals, and the detection signals of the active pixels APcx, APcy, APdx, and APdy may be sequentially read out in the order of columns "x" to "z". Accordingly, the active pixels APcx and APcy, or APdx and APdy belonging to the same row may be simultaneously selected. For example, the active pixels APcx and APcy belonging to the row "c" may be simultaneously selected. Also, the monitoring pixel MPcz belonging to the row "c" may be simultaneously selected. This will be described in detail with reference to FIG. 3.

Figure 3:
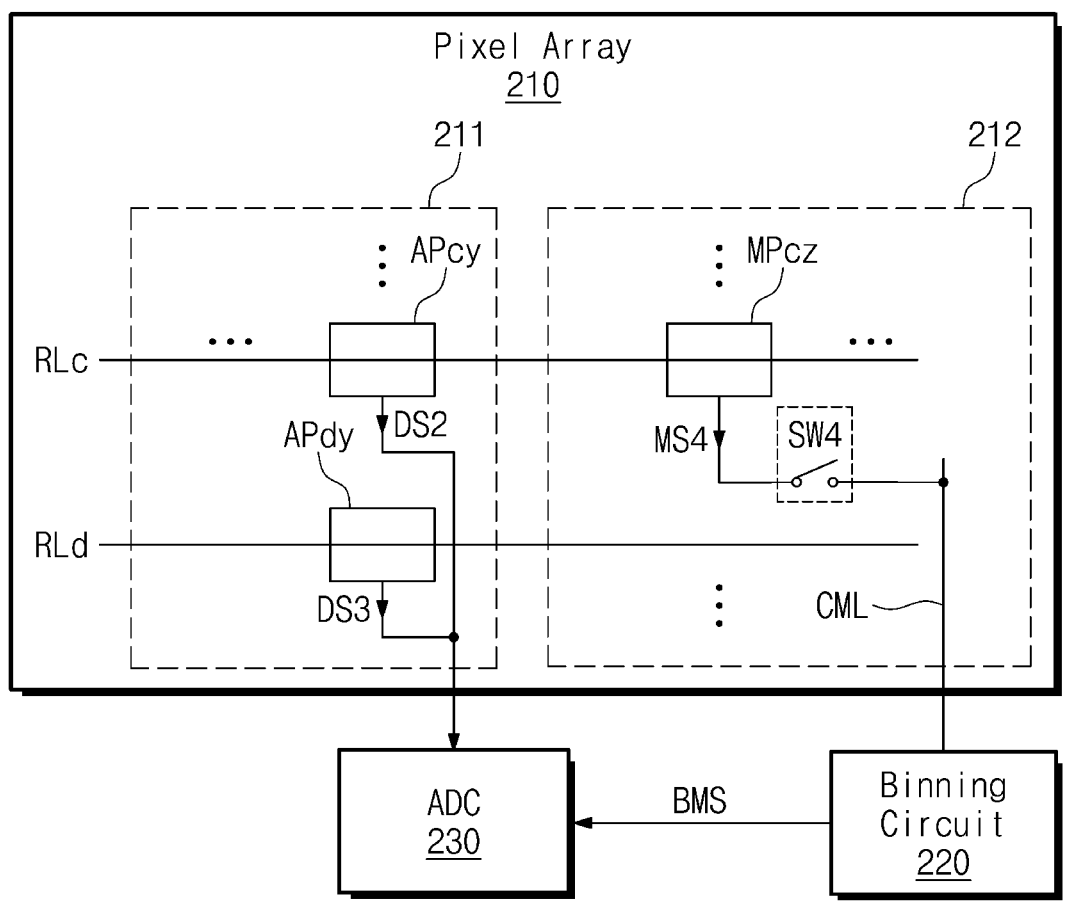
FIG. 3 is a block diagram illustrating an image sensor according to another embodiment of the disclosure.

FIG. 3 is a block diagram illustrating an image sensor according to another embodiment of the disclosure. FIG. 3 will be described together with reference to FIGS. 1 and 2. An image sensor 200 may include a pixel array 210, a binning circuit 220, and an ADC 230. The pixel array 210 may include an active pixel area 211, a monitoring pixel area 212, and row lines RLc and RLd. The active pixel area 211 may include the active pixels APcy and APdy of FIG. 2. The monitoring pixel area 212 may include the monitoring pixel MPcz of FIG. 2, the common monitor output line CML, and a switch SW4 to selectively connect the monitoring pixel MPcz to the common monitor output line CML. The row line RLc may be connected to the active pixel APcy and the monitoring pixel MPcz belonging to the row "c". The row line RLd may be connected to the active pixel APdy belonging to the row "d". The binning circuit 220 and the ADC 230 may be identical to the binning circuit 120 and the ADC 130 of FIG. 1.

The active pixels APcy and APdy may be sequentially selected in the order of rows "c" and "d", and the selected active pixels APcy and APdy may output detection signals DS2 and DS3 to the ADC 230. To compensate for a noise of the detection signal DS3 output from the active pixel APdy, the switch SW4 may electrically connect the monitoring pixel MPcz to the common monitor output line CML, and the binning circuit 220 may receive a monitoring signal MS4 output from the monitoring pixel MPcz through the common monitor output line CML. The binning circuit 220 may generate the average monitoring signal BMS based on the monitoring signal MS4, and the ADC 230 may use the average monitoring signal BMS for the purpose of compensating for the noise of the detection signal DS3.

However, in the case of selecting the monitoring pixel MPcz for the purpose of outputting the monitoring signal MS4, the active pixel APcy connected to the same row line RLc as the monitoring pixel MPcz may also be selected. Accordingly, the selected active pixel APcy may output the detection signal DS2 at a time when the monitoring pixel MPcz outputs the monitoring signal MS4. As such, in the case of using the monitoring signal MS4 from the monitoring pixel MPcz connected to the same row line RLc as another active pixel APcy for the purpose of compensating for the noise of the detection signal DS3 of one active pixel APdy, the ADC 230 may receive both the detection signal DS2 of the active pixel APcy and the detection signal DS3 of the active pixel APdy.

Figure 4:
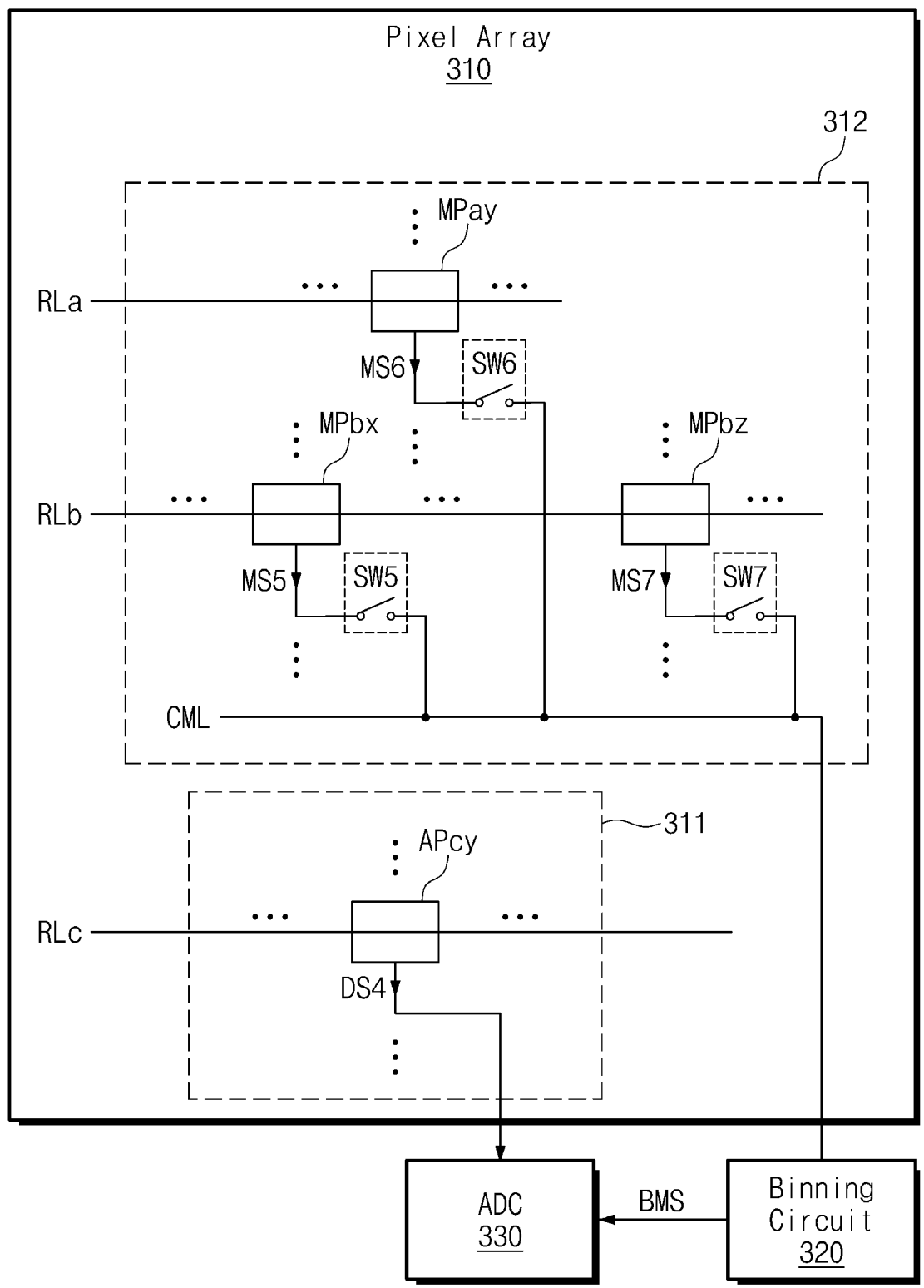
FIG. 4 is a block diagram illustrating an image sensor according to another embodiment of the disclosure.

FIG. 4 is a block diagram illustrating an image sensor according to another embodiment of the disclosure. FIG. 4 will be described with reference to FIGS. 1 to 3. An image sensor 300 may include a pixel array 310, a binning circuit 320, and an ADC 330. The pixel array 310 may include an active pixel area 311, a monitoring pixel area 312, and row lines RLa, RLb, and RLc. The active pixel area 311 may include the active pixel APcy of FIG. 2. The monitoring pixel area 312 may include the monitoring pixels MPay, MPbx, and MPbz of FIG. 2, the common monitor output line CML, and switches SW5 to SW7 to selectively connect the monitoring pixels MPay, MPbx, and MPbz to the common monitor output line CML, respectively. The row line RLa may be connected to the monitoring pixel MPay belonging to the row "a". The row line RLb may be connected to the monitoring pixels MPbx and MPbz belonging to the row "b". The row line RLc may be connected to the active pixel APcy belonging to the row "c". The binning circuit 320 and the ADC 330 may be identical to the binning circuit 120 and the ADC 130 of FIG. 1.

Because the monitoring pixels MPay, MPbx, and MPbz are connected to the row lines RLa and RLb different from the row line RLc connected to the active pixel APcy, even though the monitoring pixels MPay, MPbx, and MPbz are selected, the active pixel APcy may not be selected. The monitoring pixels MPay, MPbx, and MPbz may be electrically connected to the common monitor output line CML through the switches SW5, SW6, and SW7, respectively. The switches SW5, SW6, and SW7 may selectively connect the monitoring pixels MPay, MPbx, and MPbz to the common monitor output line CML, respectively. The switches SW5 to SW7 may be controlled by a controller (e.g., a control circuit 550 of FIG. 10 to be described later). The switches SW5 to SW7 are substantially identical to the switches SW1 to SW3 of FIG. 1.

In the case where the active pixel APcy outputs a detection signal DS4, a coupling noise between pixels in the pixel array 310 and a power (or ground) noise may occur. To compensate for a noise, the monitoring pixels MPay, MPbx, and MPbz may output monitoring signals MS5 to MS7 through the common monitor output line CML. To compensate for a noise of the same time, the active pixel APcz and the monitoring pixels MPay and MPbz may simultaneously output the detection signal DS4 and the monitoring signals MS5 to MS7.

Because the switches SW5 to SW7 selectively connect the monitoring pixels MPay, MPbx, and MPbz to the common monitor output line CML, respectively, the binning circuit 320 may selectively receive the monitoring signals MS5 to MS7 from the monitoring pixels MPay, MPbx, and MPbz. For example, in the case where the switches SW5 and SW6 electrically connect the monitoring pixels MPay and MPbx to the common monitor output line CML and the switch SW7 does not electrically connect the monitoring pixel MPbz to the common monitor output line CML, the binning circuit 320 may receive the monitoring signals MS5 and MS6 and may perform binning on the monitoring signals MS5 and MS6 to output the average monitoring signal BMS. Coupling between circuit elements may be described herein as "electrically connect" or "connect," with the same meaning. The ADC 330 may sample an AC component of the average monitoring signal BMS and may couple the sampled AC component of the average monitoring signal BMS with the detection signal DS4.

Figure 5:
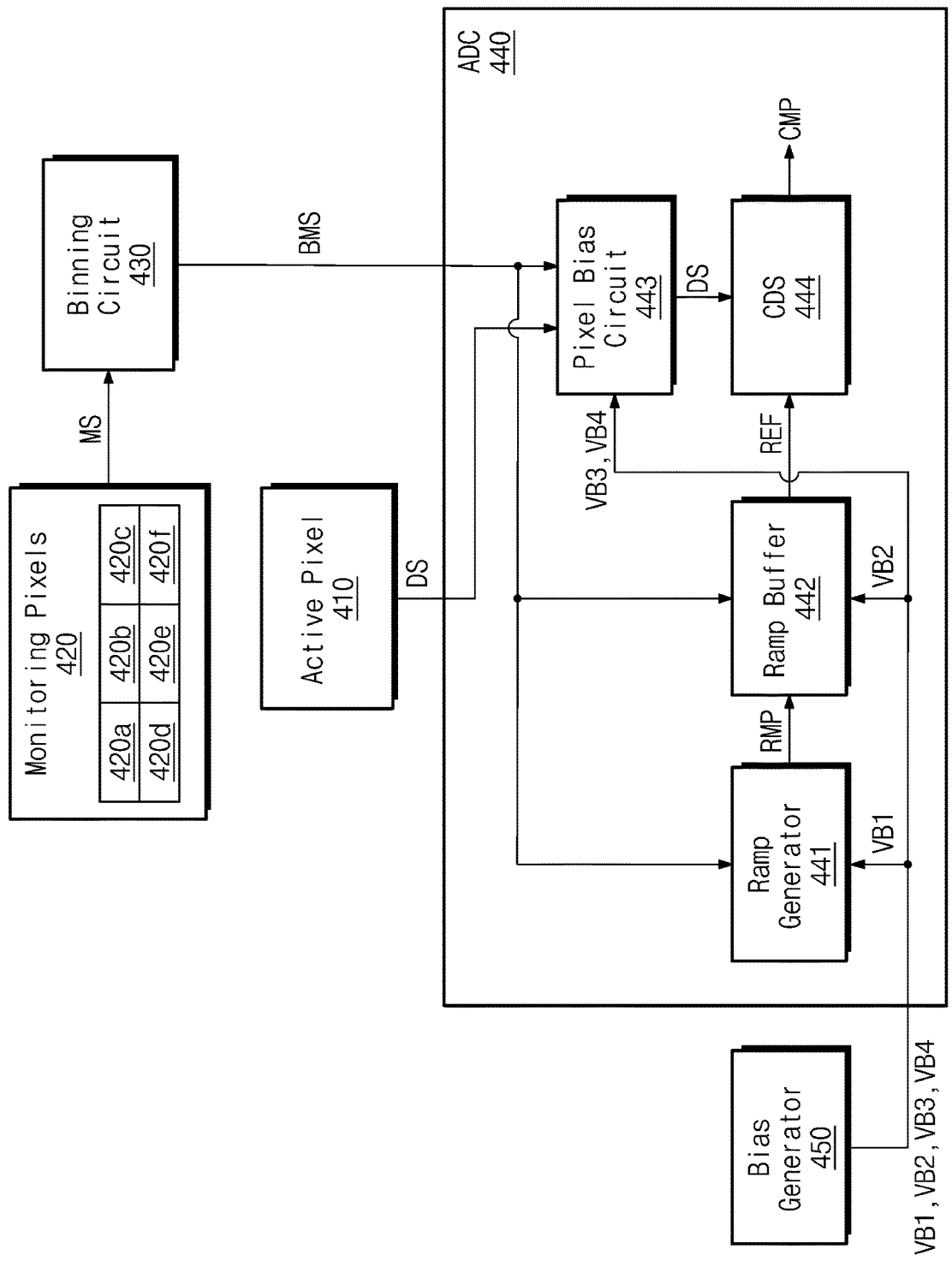
FIG. 5 is a block diagram illustrating an image sensor according to another embodiment of the disclosure.

FIG. 5 is a block diagram illustrating an image sensor according to another embodiment of the disclosure. An image sensor 400 may include an active pixel 410, a plurality of monitoring pixels 420a to 420f (collectively referred to as "420"), a binning circuit 430, an ADC 440, and a bias signal generator 450. The ADC 440 may include a ramp signal generator 441, a ramp buffer 442, a pixel bias circuit 443, and a correlated double sampling (CDS) circuit 444.

The ramp signal generator 441 may generate a ramp signal RMP having levels linearly varying over time. The ramp buffer 442 may output a reference signal REF based on the ramp signal RMP. The pixel bias circuit 443 may drive the active pixel 410 such that the detection signal DS is output to a CDS circuit 444. The CDS circuit 444 may receive the reference signal REF from the ramp buffer 442 and may receive the detection signal DS from the active pixel 410 (or the pixel bias circuit 443). The bias signal generator 450 may generate bias signals VB1 to VB4. For example, the bias signals VB1 to VB4 may be one of various analog signals including a voltage, a current, etc. At least one of the ramp signal generator 441, the ramp buffer 442, and the pixel bias circuit 443 may receive the average monitoring signal BMS from the binning circuit 430 and may sample an AC component of the average monitoring signal BMS.

Figure 6:
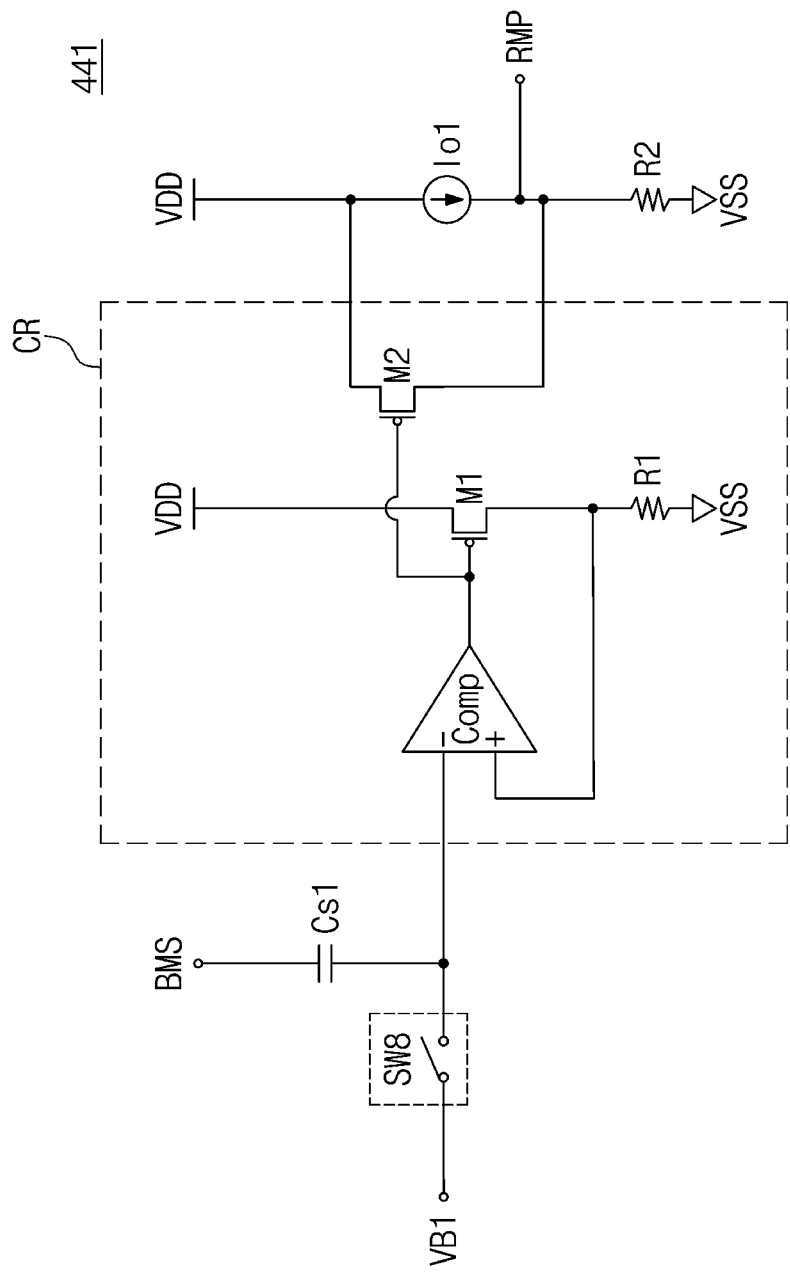
FIG. 6 is a circuit diagram illustrating a ramp signal generator of FIG. 5.

FIG. 6 is a circuit diagram illustrating a ramp signal generator of FIG. 5. The ramp signal generator 441 may include a sampling switch SW8, a sampling capacitor Cs1, a comparator Comp, transistors M1 and M2, resistors R1 and R2, and a current source Io1.

An inverting input terminal of the comparator Comp may receive a bias signal VB1 through the sampling switch SW8. The inverting input terminal of the comparator Comp may receive the average monitoring signal BMS through the sampling capacitor Cs1. An AC component of the average monitoring signal BMS received through the sampling capacitor Cs' may be sampled. For example, the inverting input terminal of the comparator Comp may receive the bias signal VB1 through the sampling switch SW8 and may then receive the average monitoring signal BMS through the sampling capacitor Cs1. For another example, the inverting input terminal of the comparator Comp may receive the average monitoring signal BMS through the sampling capacitor Cs1 and may then receive the bias signal VB1 through the sampling switch SW8. In each example, the sampling switch SW8 may be controlled to selectively receive the bias signal VB1 (e.g., by the control circuit 550 of FIG. 10). The sampling switch SW8 may be implemented with a transistor, a diode, etc.

A first end of the resistor R1 may be connected to a non-inverting input terminal of the comparator Comp and a first terminal (e.g., a drain) of the transistor M1. A second terminal of the resistor R1 may be connected to a power supply voltage VSS. A second terminal (e.g., a gate) of the transistor M1 may be connected to an output terminal of the comparator Comp. A third terminal (e.g., a source) of the transistor M1 may be connected to a power supply voltage VDD. A current that is determined depending on an output voltage of the comparator Comp may flow through the transistor M1 and the resistor R1, and a voltage that is input to the non-inverting input terminal of the comparator Comp may be determined by the current flowing through the resistor R1.

A first terminal (e.g., a gate) of the transistor M2 may be connected to the output terminal of the comparator Comp. A second terminal (e.g., a source) of the transistor M2 may be connected to the power supply voltage VDD. A third terminal (e.g., a drain) of the transistor M2 may be connected to a first end of the resistor R2. A second terminal of the resistor R2 may be connected to the power supply voltage VSS. The current source Io1 may be connected between the power supply voltage VDD and the first end of the resistor R2. A current generated from the current source Io1 and a current flowing through the transistor M2 may flow through the resistor R2, and a level of the ramp signal RMP may be determined by the current flowing through the resistor R2. A level of the current flowing through the transistor M2 may be determined depending on the output voltage of the comparator Comp. A structure that is implemented with the comparator Comp, the transistors M1 and M2, and the resistor R1 may be referred to as a "current regulator (CR)".

The sampled AC component of the average monitoring signal BMS input to the inverting input terminal of the comparator Comp may be reflected to the ramp signal RMP. By using the ramp signal RMP including the AC component sampled for the correlated double sampling of the detection signal DS in the CDS circuit 444 (refer to FIG. 5), it may be possible to compensate for a coupling noise between pixels included in the detection signal DS, and a power noise (or a ground noise).

Figure 7:
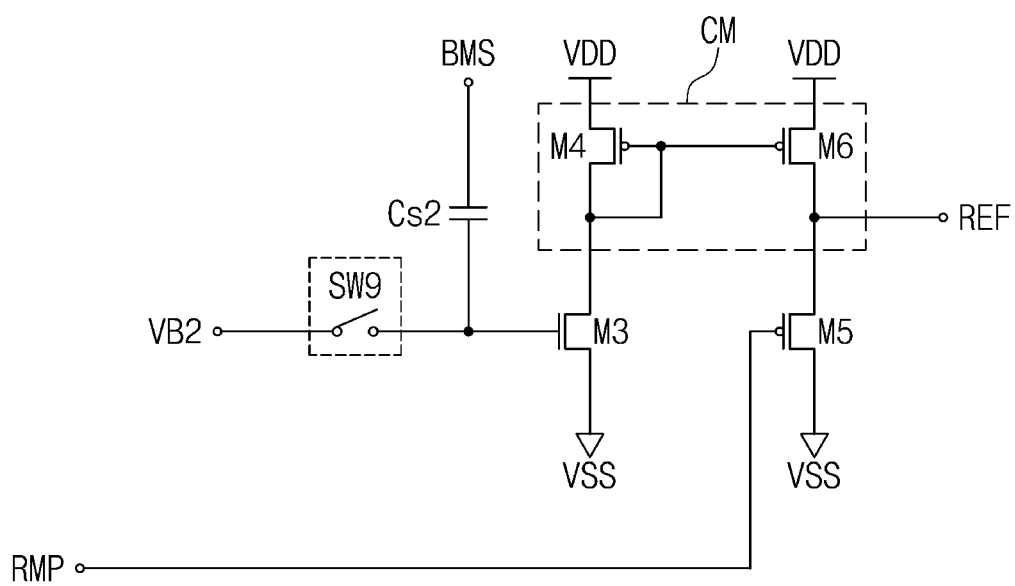
FIG. 7 is a circuit diagram illustrating a ramp buffer of FIG. 5.

FIG. 7 is a circuit diagram illustrating a ramp buffer of FIG. 5. The ramp buffer 442 may include a sampling switch SW9, a sampling capacitor Cs2, and transistors M3 to M6.

A first terminal (e.g., a gate) of the transistor M3 may receive a bias signal VB2 through the sampling switch SW9. The first terminal (e.g., the gate) of the transistor M3 may further receive the average monitoring signal BMS through the sampling capacitor Cs2. An AC component of the average monitoring signal BMS received through the sampling capacitor Cs2 may be sampled. For example, the first terminal (e.g., the gate) of the transistor M3 may receive the bias signal VB2 through the sampling switch SW9 and may then receive the average monitoring signal BMS through the sampling capacitor Cs2. For another example, the first terminal (e.g., the gate) of the transistor M3 may receive the average monitoring signal BMS through the sampling capacitor Cs2 and may then receive the bias signal VB2 through the sampling switch SW9. In each example, the sampling switch SW9 may be controlled to selectively receive the bias signal VB2 (e.g., by the control circuit 550 of FIG. 10). The sampling switch SW9 may be implemented with a transistor, a diode, etc.

A second terminal (e.g., a source) of the transistor M3 may be connected to the power supply voltage VSS. A third terminal (e.g., a drain) of the transistor M3 may be connected to a first terminal (e.g., a drain) of the transistor M4. A second terminal (e.g., a source) of the transistor M4 may be connected to the power supply voltage VDD. A third terminal (e.g., a gate) of the transistor M4 may be connected to the first terminal (e.g., the drain) of the transistor M4 and a first terminal (e.g., a gate) of the transistor M6. A second terminal (e.g., a source) of the transistor M6 may be connected to the power supply voltage VDD. A third terminal (e.g., a drain) of the transistor M6 may be connected to a first terminal (e.g., a source) of the transistor M5. A second terminal (e.g., a gate) of the transistor M5 may be connected to receive the ramp signal RMP. A third terminal (e.g., a drain) of the transistor M5 may be connected to the power supply voltage VSS.

A level of a current flowing through the transistors M3 and M4 may be determined depending on a level of a signal input to the first terminal (e.g., the gate) of the transistor M3, and a level of the reference signal REF may be determined by the current flowing through the transistors M3 and M4 and a level of a signal input to the second terminal (e.g., the gate) of the transistor M5. A structure that is implemented with the transistors M4 and M6 may be referred to as a "current mirror (CM)".

The sampled AC component of the average monitoring signal BMS input to the first terminal (e.g., the gate) of the transistor M3 may be reflected to the reference signal REF. By correlated double sampling the reference signal REF including the detection signal DS and the sampled AC component in the CDS circuit 444 (refer to FIG. 5), it may be possible to compensate for a coupling noise between pixels included in the detection signal DS, and a power noise (or a ground noise).

Figure 8:
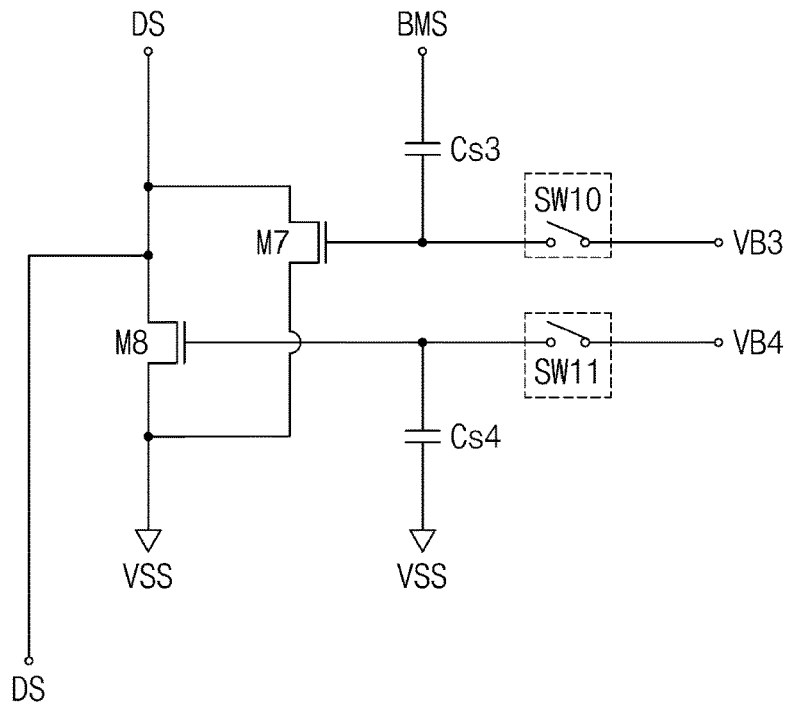
FIG. 8 is a circuit diagram illustrating a pixel bias circuit of FIG. 5.

FIG. 8 is a circuit diagram illustrating a pixel bias circuit of FIG. 5. The pixel bias circuit 443 may include sampling switches SW10 and SW11, sampling capacitors Cs3 and Cs4, and transistors M7 and M8.

A first terminal (e.g., a gate) of the transistor M7 may receive a bias signal VB3 through the sampling switch SW10. The first terminal (e.g., the gate) of the transistor M7 may also receive the average monitoring signal BMS through the sampling capacitor Cs3. An AC component of the average monitoring signal BMS received through the sampling capacitor Cs3 may be sampled. For example, the first terminal (e.g., the gate) of the transistor M7 may receive the bias signal VB3 through the sampling switch SW10 and may then receive the average monitoring signal BMS through the sampling capacitor Cs3. As used herein, "sample" may indicate "obtain" or "provide." For another example, the first terminal (e.g., the gate) of the transistor M7 may receive the average monitoring signal BMS through the sampling capacitor Cs3 and may then receive the bias signal VB3 through the sampling switch SW10. In each example, the sampling switch SW10 may be controlled to selectively receive the bias signal VB3 (e.g., by the control circuit 550 of FIG. 10).

A first terminal (e.g., a gate) of the transistor M8 may receive the bias signal VB4 through the sampling switch SW11. The first terminal (e.g., the gate) of the transistor M8 may be connected to the power supply voltage VSS through the sampling capacitor Cs4. An AC component of the power supply voltage VSS connected through the sampling capacitor Cs4 may be sampled. An operation of the sampling switch SW11 may be similar to the operation of the sampling switch SW10. Each of the sampling switches SW10 and SW11 may be implemented with a transistor, a diode, etc. It may be possible to compensate for a coupling noise between pixels included in the detection signal DS and a power noise (or a ground noise) by using the AC component of the average monitoring signal BMS input to the first terminal (e.g., the gate) of the transistor M7 and the AC component of the power supply voltage VSS of the transistor M8.

Figure 9:
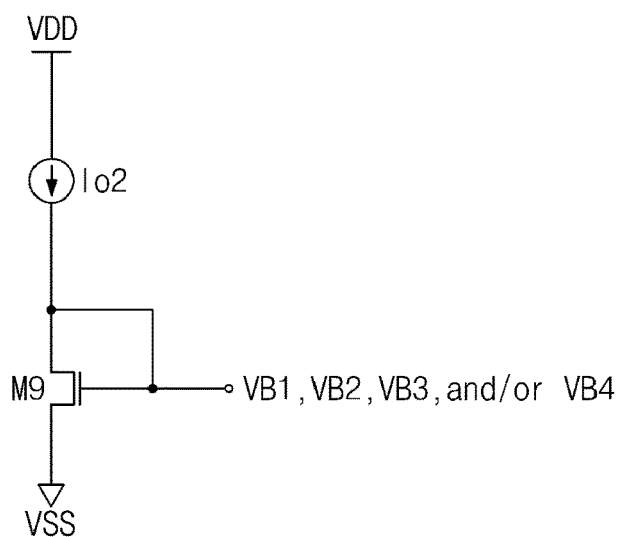
FIG. 9 is a circuit diagram illustrating a bias signal generator of FIG. 5.

FIG. 9 is a circuit diagram illustrating a bias signal generator of FIG. 5. The bias signal generator 450 may include a current source Io2 and a transistor M9. The current source Io2 may be connected between the power supply voltage VDD and a first terminal (e.g., a drain) of the transistor M9. The first terminal (e.g., the drain) of the transistor M9 may be connected to a second terminal (e.g., a gate) of the transistor M9. A third terminal (e.g., a source) of the transistor M9 may be connected to the power supply voltage VSS.

At least one of the bias signals VB1 to VB4 may be output through the second terminal (e.g., the gate) of the transistor M9. In the case where the bias signals VB1 to VB4 are output through the second terminal (e.g., the gate) of the transistor M9, at least one of the bias signals VB1 to VB4 output through the second terminal (e.g., the gate) of the transistor M9 may be determined depending on a level of a current output from the current source Io2. However, the principle of the bias signal generator 450 is not limited to the example illustrated in FIG. 9. Unlike the example illustrated in FIG. 9, the bias signal generator 450 may further include at least one circuit having the same configuration as the circuit of FIG. 9. The bias signal generator 450 may generate the bias signals VB1 to VB4 by a plurality of circuits, respectively.

Figure 10:
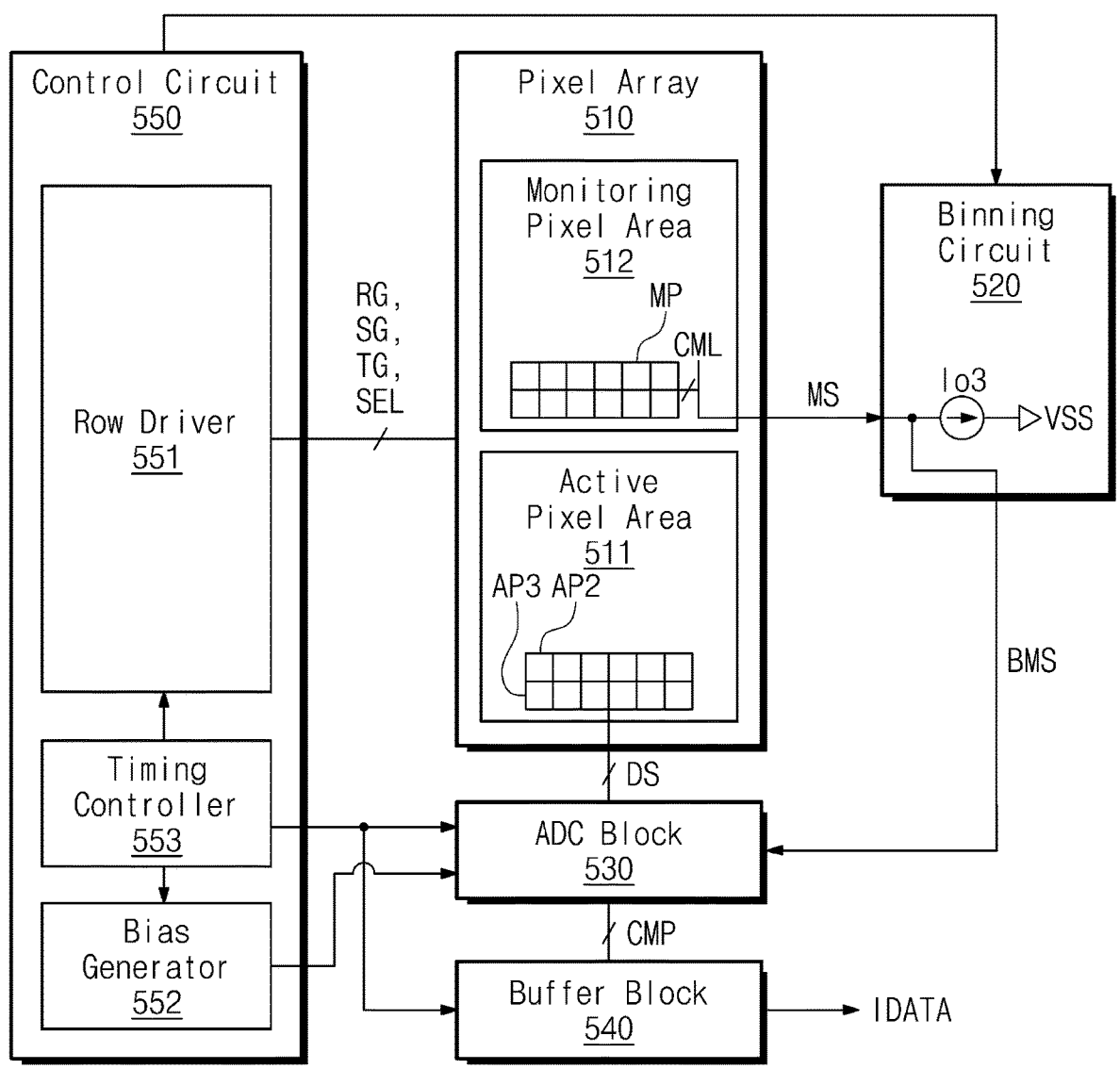
FIG. 10 is a block diagram illustrating an image sensor according to another embodiment of the disclosure.

FIG. 10 is a block diagram illustrating an image sensor according to another embodiment of the disclosure. FIG. 10 will be described with reference to FIGS. 1 to 9. An image sensor 500 may include a pixel array 510, a binning circuit 520, an ADC block 530, a buffer block 540, and the control circuit 550.

The pixel array 510 may include an active pixel area 511 and a monitoring pixel area 512. The active pixel area 511 may include a plurality of active pixels AP2 and AP3. The monitoring pixel area 512 may include a plurality of monitoring pixels MP and the common monitor output line CML. The plurality of monitoring pixels MP may share the common monitor output line CML. The plurality of monitoring pixels MP may be selectively connected to the common monitor output line CML depending on the principles described with reference to FIG. 1.

The binning circuit 520 may include a current source Io3. The current source Io3 may be connected between the common monitor output line CML and the power supply voltage VSS. The current source Io3 may be connected to the plurality of monitoring pixels MP through the common monitor output line CML. That is, the plurality of monitoring pixels MP may share the current source Io3.

The ADC block 530 may be connected to the plurality of active pixels AP. The ADC block 530 may be connected to the plurality of active pixels AP in units of columns. The ADC block 530 may include the ADC 130 of FIG. 1, the ADC 230 of FIG. 2, the ADC 330 of FIG. 4, and the ADC 440 of FIG. 5. The ADC block 530 may convert detection signals DS received from the active pixels AP2 and AP3 into a compensation signal CMP. For example, the compensation signal CMP may be a digital signal.

The buffer block 540 may receive the compensation signals CMP from the ADC block 530. The buffer block 540 may generate image data IDATA based on compensation signals.

The control circuit 550 may include a row driver 551, a bias signal generator 552, and a timing controller 553. The row driver 551 may provide a reset signal RG, a storage signal SG, a transfer signal TG, and a selection signal SEL through row lines connected to the active pixels AP2 and AP3 and the monitoring pixels MP in the pixel array 510. The row driver 551 may reset the active pixels AP2 and AP3 by the reset signal RG. The row driver 551 may read, access, or select the active pixels AP2 and AP3 by the selection signal SEL in units of rows. The storage signal SG and the transfer signal TG will be more fully described with reference to FIGS. 11 to 14. The bias signal generator 552 may operate depending on the same principle as the bias signal generator 450 of FIG. 5. The timing controller 553 may control operation timings of the row driver 551, the bias signal generator 552, the ADC block 530, and the buffer block 540. The operation timings may include various timings such as a signal input/output (I/O) timing, a selection timing, and a reset timing. Under control of the timing controller 553, the active pixels AP2 and AP3 and the monitoring pixels MP may simultaneously output the detection signal DS and the monitoring signals MS.

Figure 11:
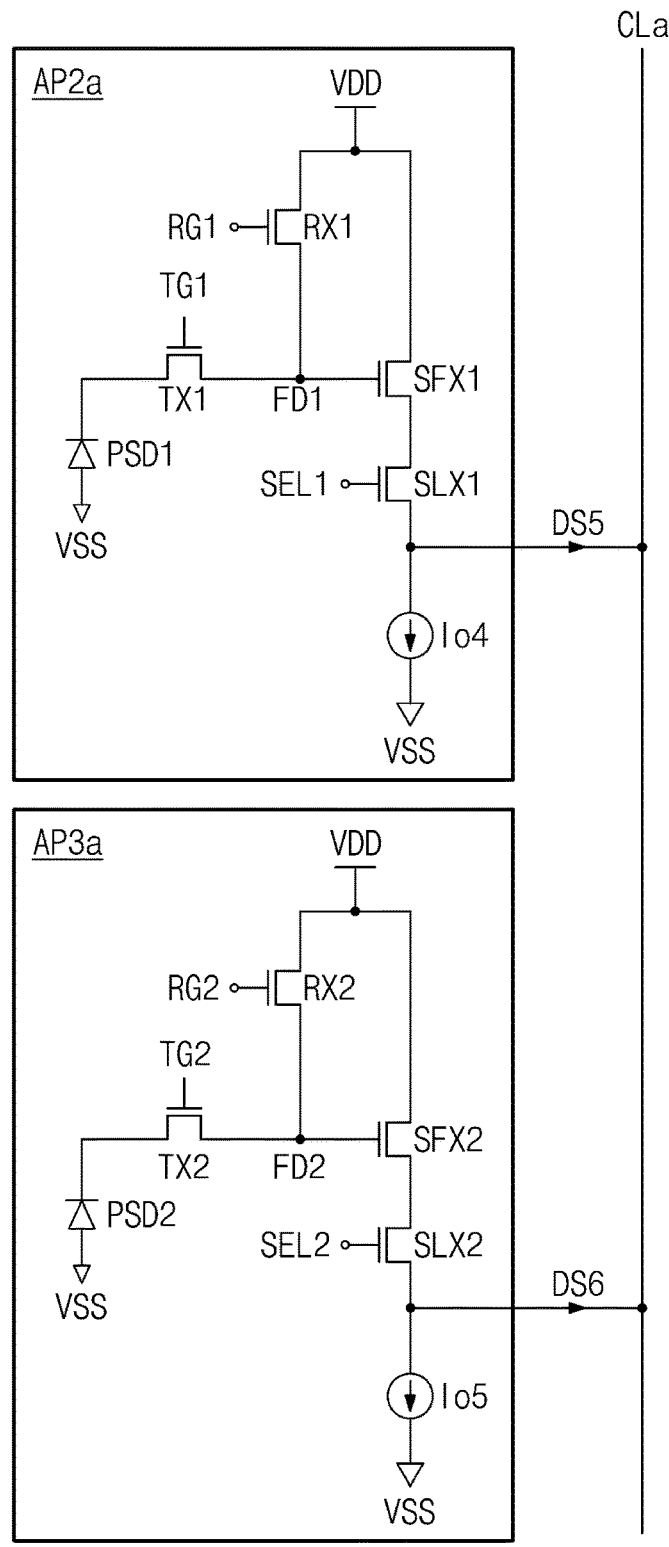
FIG. 11 is a circuit diagram illustrating active pixels of an active pixel area of FIG. 10, according to an embodiment.

FIG. 11 is a circuit diagram illustrating active pixels of an active pixel area of FIG. 10, according to an embodiment. An active pixel area 511a may include active pixels AP2a and AP3a and a column line CLa. The active pixels AP2a and AP3a may output detection signals DS5 and DS6 through the column line CLa, respectively. The active pixels AP2a and AP3a may be one of various pixels that operate depending on a rolling shutter manner. The active pixels AP2a and AP3a of an exemplary 4-T structure, which operate depending on the rolling shutter manner, are illustrated in FIG. 11, but the disclosure is not limited by FIG. 11. The active pixel AP2a may include a photo diode PSD1, a reset transistor RX1, a transfer transistor TX1, a source follower transistor SFX1, a selection transistor SLX1, and a current source Io4.

The photo diode PSD1 may generate, integrate, and output charges in response to an incident light received from the outside. The amount of charges generated by the photo diode PSD1 may be proportional to the intensity of the incident light. The photo diode PSD1 is an example, and the photo diode PSD1 may be replaced with one of various components (e.g., a photo transistor and a photo gate) to convert an incident light into an electrical signal, or a combination thereof. A first terminal of the photo diode PSD1 may be connected to the power supply voltage VSS.

A first terminal (e.g., a drain) of the transfer transistor TX1 may be connected to a second terminal of the photo diode PSD1. A second terminal (e.g., a gate) of the transfer transistor TX1 may be connected to receive a transfer signal TG1. A third terminal (e.g., a source) of the transfer transistor TX1 may be connected to a floating diffusion (FD) node FD1. The transfer transistor TX1 may electrically connect the photo diode PSD1 and the FD node FD1 based on the transfer signal TG1. The transfer transistor TX1 may be turned on or turned off by the transfer signal TG1. The transfer transistor TX1 may transfer charges (or electrons) generated by the photo diode PSD1 to the FD node FD1.

Although not illustrated in FIG. 11, the active pixel AP2a may further include a passive element (e.g., a capacitor) connected to the FD node FD1. The amount of charges "Q" transferred to the FD node FD1 through the transfer transistor TX1 may be converted into an electrical signal (e.g., a voltage difference dV) by a capacitance Cfd of a capacitor connected to the FD node FD1 (dV=Q/Cfd). Charges corresponding to an electrical signal provided from the photo diode PSD1 may be accumulated or stored at the FD node FD1.

A first terminal (e.g., a drain) of the reset transistor RX1 may be connected to the power supply voltage VDD. A second terminal (e.g., a gate) of the reset transistor RX1 may be connected to receive a reset signal RG1. A third terminal (e.g., a source) of the reset transistor RX1 may be connected to the FD node FD1. The reset transistor RX1 may reset the FD node FD1 to the power supply voltage VDD based on the reset signal RG1. The reset transistor RX1 may discharge charges stored at the FD node FD1. The reset transistor RX1 may be turned on or turned off by the reset signal RG1. Also, when the reset transistor RX1 is turned on and the transfer transistor TX1 is turned on, charges of the photo diode PSD1 may be discharged, and thus, the photo diode PSD1 may be reset.

A first terminal (e.g., a drain) of the source follower transistor SFX1 may be connected to the power supply voltage VDD. A second terminal (e.g., a gate) of the source follower transistor SFX1 may be connected to the FD node FD1. A third terminal (e.g., a source) of the source follower transistor SFX1 may be connected to a first terminal (e.g., a drain) of the selection transistor SLX1. The source follower transistor SFX1 may generate a signal (e.g., a current or a voltage) proportional to the amount of charges input from the FD node FD1 to the second transistor (e.g., the gate) of the source follower transistor SFX1. The source follower transistor SFX1 may output the detection signal DS5 through the selection transistor SLX1 based on the voltage of the FD node FD1.

A second terminal (e.g., a gate) of the selection transistor SLX1 may be connected to receive a selection signal SEL1. A third terminal (e.g., a source) of the selection transistor SLX1 may be connected to a first terminal of the current source Io4 and the column line CLa. The selection transistor SLX1 may select the active pixel AP2a based on a selection signal SEL1. The selection transistor SLX1 may be turned on or turned off by the selection signal SEL1. In a turned-on state, the selection transistor SLX1 may output the detection signal DS5 received through the source follower transistor SFX1 to the column line CLa. The current source Io4 may limit a level of a current flowing through the source follower transistor SFX1 and the selection transistor SLX1. A second terminal of the current source Io4 may be connected to the power supply voltage VSS.

The active pixel AP3a may include a photo diode PSD2, a reset transistor RX2, a transfer transistor TX2, a source follower transistor SFX2, a selection transistor SLX2, and a current source Io5. Referring to the above description of the active pixel AP2a, the active pixel AP3a may have the same structure as the active pixel AP2a, and the components PSD2, RX2, TX2, SFX2, SLX2, and Io5 of the active pixel AP3a may perform substantially the same functions as the components PSD1, RX1, TX1, SFX1, SLX1, and Io4 of the active pixel AP2*a*. A principle that the active pixels AP2*a* and AP3*a* operate depending on the signals RG1, TG1, SEL1, RG2, TG2, and SEL2 applied to the transistors RX1, TX1, SFX1, SLX1, RX2, TX2, SFX2, and SLX2 will be more fully described with reference to FIG. 12. The names, the structures, and the number of transistors RX1, TX1, SFX1, SLX1, RX2, TX2, SFX2, and SLX2 described above are only an example.

Figure 12:
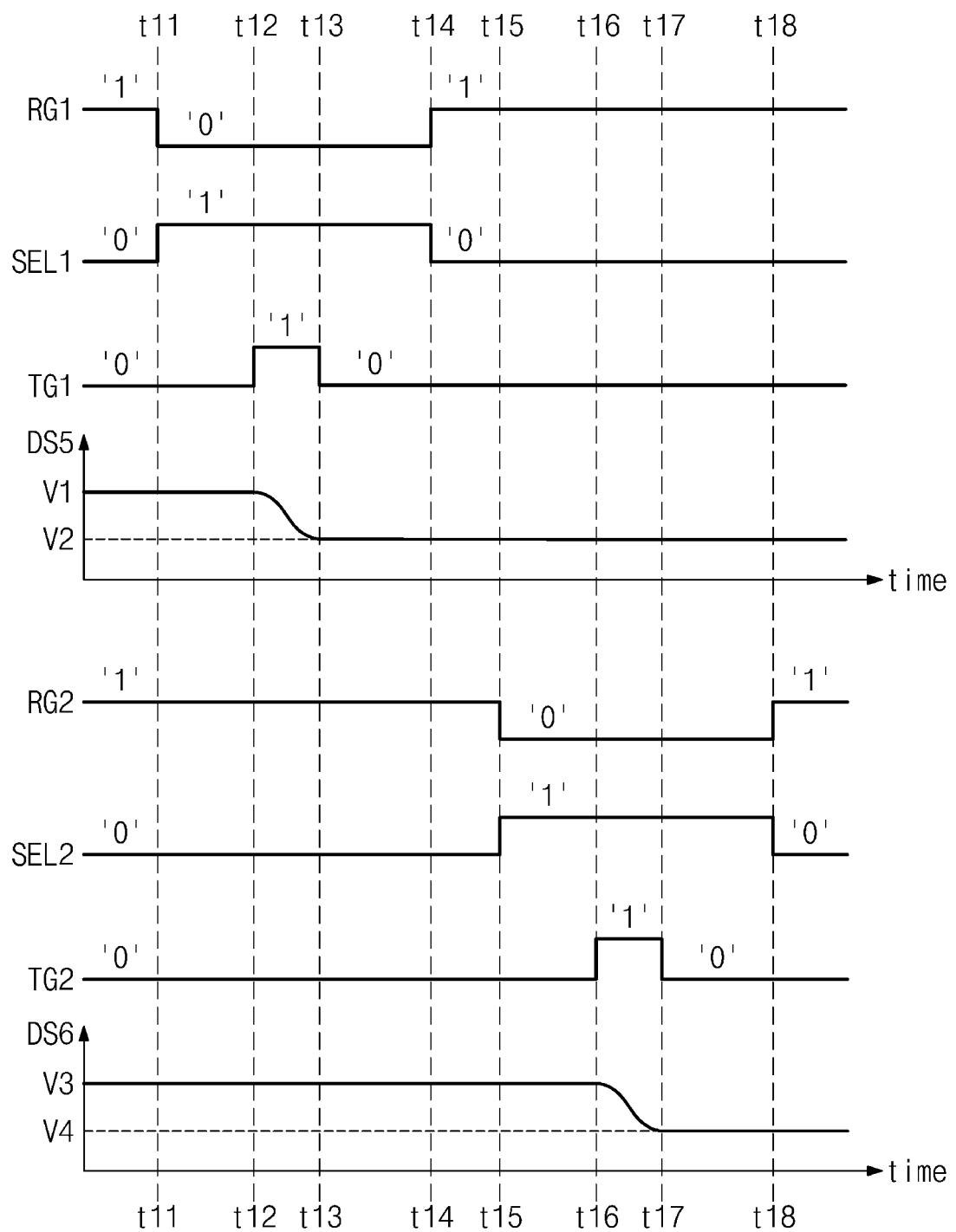
FIG. 12 illustrates a timing diagram illustrating signals applied to transistors of FIG. 11 and detection signals.

FIG. 12 illustrates a timing diagram illustrating signals applied to transistors of FIG. 11 and detection signals. In FIG. 12, it is assumed that the signals RG1, SEL1, TG1, RG2, SEL2, and TG2 are activated when levels of the signals RG1, SEL1, TG1, RG2, SEL2, and TG2 correspond to logical high (or logic "1"). That is, it is assumed that the transistors RX1, TX1, SFX1, SLX1, RX2, TX2, SFX2, and SLX2 are turned on when the signals RG1, SEL1, TG1, RG2, SEL2, and TG2 are activated to logical high. Also, it is assumed that the signals RG1, SEL1, TG1, RG2, SEL2, and TG2 are deactivated when levels of the signals RG1, SEL1, TG1, RG2, SEL2, and TG2 correspond to logical low (or logic "0"). That is, it is assumed that the transistors RX1, TX1, SFX1, SLX1, RX2, TX2, SFX2, and SLX2 are turned off when the signals RG1, SEL1, TG1, RG2, SEL2, and TG2 are deactivated to logical low. Levels of the above signals are only an example.

Before a time t11, the FD node FD1 of the active pixel AP2*a* may be reset. At the time t11, the reset transistor RX1 may be turned off as the reset signal RG1 is deactivated and the selection transistor SLX1 may be turned on as the selection signal SEL1 is activated (i.e., the active pixel AP2*a* being selected). An example is illustrated in FIG. 12 as an active-to-inactive switching time t11 of the reset signal RG1 is identical to an inactive-to-active switching time t11 of the selection signal SEL1, but they may be different.

At a time t12, the transfer transistor TX1 may be turned on as the transfer signal TG1 is activated, and the transfer transistor TX1 may transfer charges, which are generated by the photo diode PSD1 in response to a first incident light, to the FD node FD1. In a time interval t12 to t13, a level of the detection signal DS5 output from the selection transistor SLX1 may change from level V1 to level V2 by charges of the FD node FD1 input to the second terminal (e.g., the gate) of the source follower transistor SFX1 (e.g., decrease in the case where V1>V2).

After a time t14, the FD node FD1 of the active pixel AP2*a* may be reset. At the time t14, the reset transistor RX1 may be turned on as the reset signal RG1 is activated and the selection transistor SLX1 may be turned off as the selection signal SEL1 is deactivated (i.e., the active pixel AP2*a* being not selected). An example is illustrated in FIG. 12 as an inactive-to-active switching time t14 of the reset signal RG1 is identical to an active-to-inactive switching time t14 of the selection signal SEL1, but they may be different.

Before a time t15 (including a time interval t11 to t14 of selecting the active pixel AP2*a*), a FD node FD2 of the active pixel AP3*a* may be reset. At the time t15, the reset transistor RX2 may be turned off as the reset signal RG2 is deactivated and the selection transistor SLX2 may be turned on as the selection signal SEL2 is activated (i.e., the active pixel AP3*a* being selected). An example is illustrated in FIG. 12 as an active-to-inactive switching time t15 of the reset signal RG2 is identical to an inactive-to-active switching time t15 of the selection signal SEL2, but they may be different.

At a time t16, the transfer transistor TX2 may be turned on as the transfer signal TG2 is activated, and the transfer transistor TX2 may transfer charges, which are generated by the photo diode PSD2 in response to a second incident light, to the FD node FD2. In a time interval t16 to t17, a level of the detection signal DS6 output from the selection transistor SLX2 may change from level V3 to level V4 by charges of the FD node FD2 input to the second terminal (e.g., the gate) of the source follower transistor SFX2 (e.g., decrease in the case where V3>V4).

After a time t18, the FD node FD2 of the active pixel AP3*a* may be reset. At the time t18, the reset transistor RX2 may be turned on as the reset signal RG2 is activated and the selection transistor SLX2 may be turned off as the selection signal SEL2 is deactivated (i.e., the active pixel AP3*a* being not selected). An example is illustrated in FIG. 12 as an inactive-to-active switching time t18 of the reset signal RG2 is identical to an active-to-inactive switching time t18 of the selection signal SEL2, but they may be different.

Referring to FIGS. 11 and 12, after the transfer transistor TX1 of the active pixel AP2*a* transfers charges, which are generated by the photo diode PSD1 of the active pixel AP2*a*, to the FD node FD1, the transfer transistor TX2 of the active pixel AP3*a* may transfer charges, which are generated by the photo diode PSD2 of the active pixel AP3*a*, to the FD node FD2.

Figure 13:
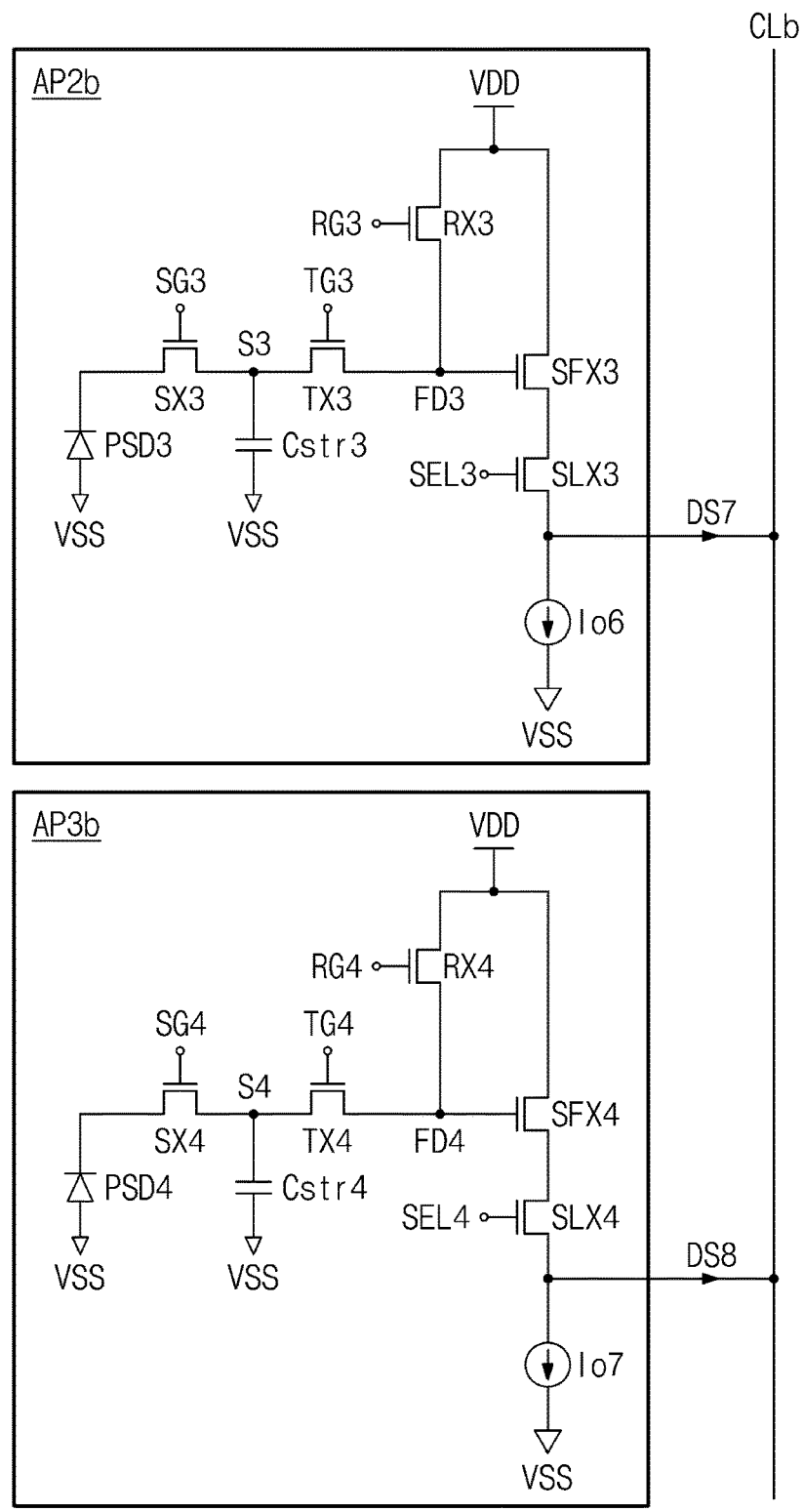
FIG. 13 is a circuit diagram illustrating active pixels of an active pixel area of FIG. 10, according to another embodiment.

FIG. 13 is a circuit diagram illustrating active pixels of an active pixel area of FIG. 10, according to another embodiment. An active pixel area 511*b* may include active pixels AP2*b* and AP3*b* and a column line CLb. The active pixels AP2*b* and AP3*b* may output detection signals DS7 and DS8 through the column line CLb, respectively. The active pixels AP2*b* and AP3*b* may be one of various pixels that operate depending on a global shutter manner. The active pixels AP2*b* and AP3*b* of an exemplary 5-T structure, which operate depending on the global shutter manner, are illustrated in FIG. 13, but the disclosure is not limited by FIG. 13. The active pixel AP2*b* may include a photo diode PSD3, a reset transistor RX3, a storage transistor SX3, a transfer transistor TX3, a source follower transistor SFX3, a selection transistor SLX3, and a current source Io6.

A description will be focused on a difference between the circuit diagram of FIG. 13 and the circuit diagram of FIG. 11. In detail, in the circuit diagram of FIG. 11, the transfer transistor TX1/TX2 is present between the photo diode PDS1/PSD2 and the FD node FD1/FD2; in contrast, in the circuit diagram of FIG. 13, the storage transistor SX3/SX4, a storage capacitor Cstr3/Cstr4, an S node S3/S4, and the transfer transistor TX3/TX4 are present between the photo diode PSD3/PSD4 and the FD node FD3/FD4. The photo diodes PSD3 and PSD4 of FIG. 13 are substantially identical to the photo diodes PSD1 and PSD2 of FIG. 11.

In the active pixel AP2*b*, a first terminal (e.g., a drain) of the storage transistor SX3 may be connected to the photo diode PSD3. A second terminal (e.g., a gate) of the storage transistor SX3 may be connected to receive a storage signal SG3. A third terminal (e.g., a source) of the storage transistor SX3 may be connected to a first terminal (i.e., the S node S3) of the storage capacitor Cstr3. The storage transistor SX3 may electrically connect the photo diode PSD3 and the storage capacitor Cstr3 based on the storage signal SG3. The storage transistor SX3 may be turned on or turned off by the storage signal SG3. The storage transistor SX3 may transfer charges (or electrons) generated by the photo diode PSD3 to the S node S3 or the storage capacitor Cstr3.

The storage capacitor Cstr3 of the storage transistor SX3 may store charges (or electrons) generated by the photo diode PSD3. A second terminal of the storage capacitor Cstr3 may be connected to the power supply voltage VSS.

The storage capacitor Cstr3 may be replaced with various active or passive elements capable of storing charges (or electrons).

A third terminal (e.g., a source) of the transfer transistor TX3 may be connected to the first terminal (i.e., the S node S3) of the storage capacitor Cstr3. A second terminal (e.g., a gate) of the transfer transistor TX3 may be connected to receive a transfer signal TG3. A third terminal (e.g., a source) of the transfer transistor TX3 may be connected to the FD node FD3. The transfer transistor TX1 may electrically connect the storage capacitor Cstr3 and the FD node FD3 based on the transfer signal TG3. A process that the detection signal DS7 is output by the transfer transistor TX3, the FD node FD3, the reset transistor RX3, the source follower transistor SFX3, and the selection transistor SLX3 based on the signals TG3, RG3, and SEL3 may be substantially identical to the process that the detection signal DS5 is output by the transfer transistor TX1, the FD node FD1, the reset transistor RX1, the source follower transistor SFX1, and the selection transistor SLX1 based on the signals TG1, RG1, and SEL1, which is described with reference to FIG. 11.

The active pixel AP3b may include the photo diode PSD4, the reset transistor RX4, the storage transistor SX4, the transfer transistor TX4, a source follower transistor SFX4, a selection transistor SLX4, and a current source Io7. The active pixel AP3b may have substantially the same structure as the active pixel AP2b, and the components PSD4, RX4, SX4, Cstr4, TX4, SFX4, SLX4, and Io7 of the active pixel AP3b may perform substantially the same functions as the components PSD3, RX3, SX3, Cstr3, TX3, SFX3, SLX3, and Io6 of the active pixel AP2b. A principle that the active pixels AP2b and AP3b operate depending on the signals RG3, SG3, TG3, SEL3, RG4, SG4, TG4, and SEL4 applied to the transistors RX3, SX3, TX3, SFX3, SLX3, RX4, SX4, TX4, SFX4, and SLX4 will be more fully described with reference to FIG. 14. The names, the structures, and the number of transistors RX3, SX3, TX3, SFX3, SLX3, RX4, SX4, TX4, SFX4, and SLX4 described above are only an example.

Figure 14:
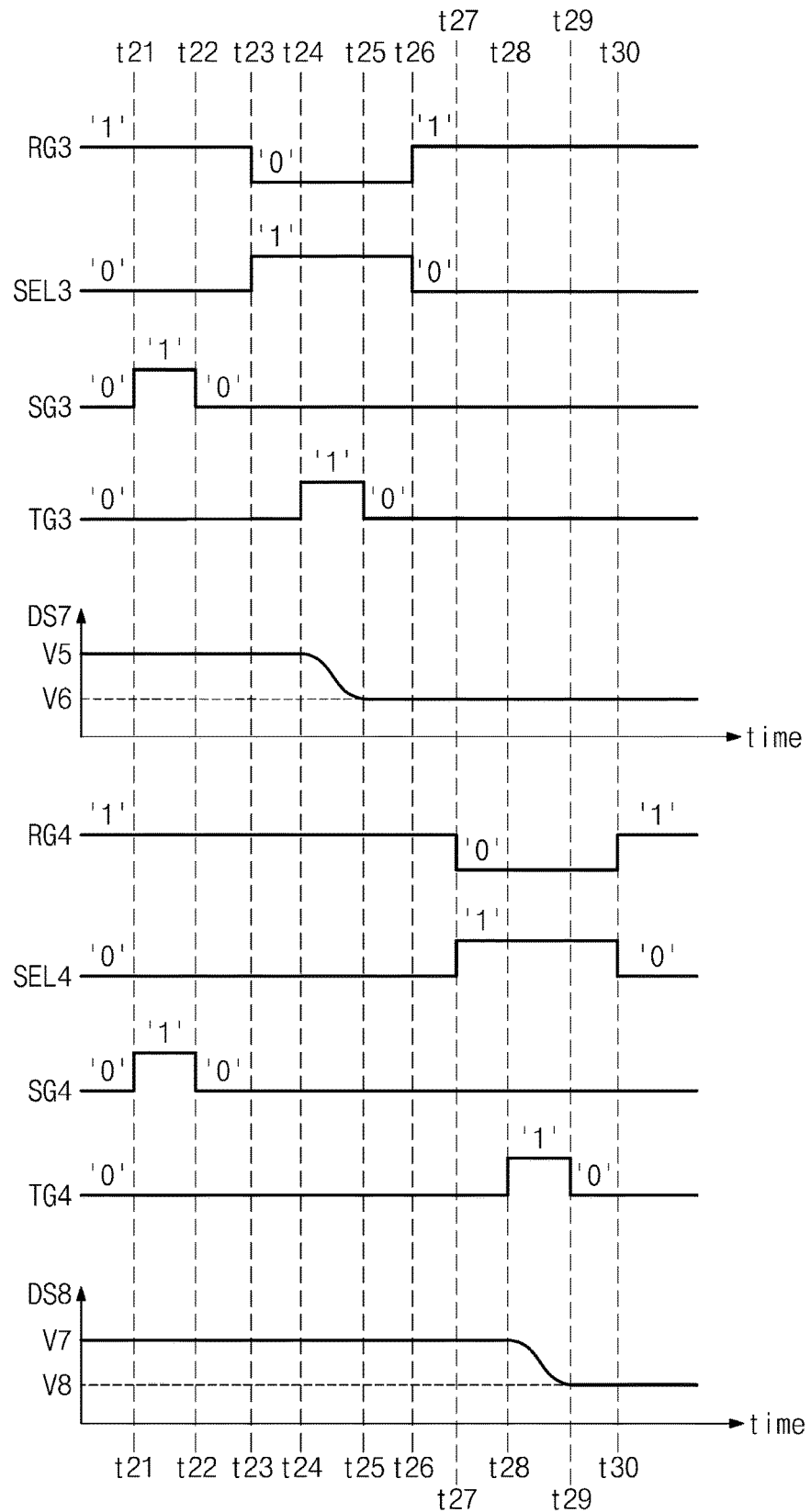
FIG. 14 illustrates a timing diagram illustrating signals applied to transistors of FIG. 13 and detection signals.

FIG. 14 illustrates a timing diagram illustrating signals applied to transistors of FIG. 13 and detection signals. In FIG. 14, it is assumed that the signals RG3, SEL3, SG3, TG3, RG4, SEL4, SG4, and TG4 are activated when levels of the signals RG3, SEL3, SG3, TG3, RG4, SEL4, SG4, and TG4 correspond to logical high (or logic "1"). That is, it is assumed that the transistors RX3, SX3, TX3, SFX3, SLX3, RX4, SX3, TX4, SFX4, and SLX4 are turned on when the signals RG3, SEL3, SG3, TG3, RG4, SEL4, SG4, and TG4 are activated to logical high. Also, it is assumed that the signals RG3, SEL3, SG3, TG3, RG4, SEL4, SG4, and TG4 are deactivated when levels of the signals RG3, SEL3, SG3, TG3, RG4, SEL4, SG4, and TG4 correspond to logical low (or logic "0"). That is, it is assumed that the transistors RX3, SX3, TX3, SFX3, SLX3, RX4, SX3, TX4, SFX4, and SLX4 are turned off when the signals RG3, SEL3, SG3, TG3, RG4, SEL4, SG4, and TG4 are activated to logical low. Levels of the above signals are only an example.

In a time interval t21 to t22, the storage transistors SX3 and SX4 may be turned on as the storage signals SG3 and SG4 are activated, and the storage transistors SX3 and SX4 may transfer charges, which are generated by the photo diodes PSD3 and PSD4 in response to first and second incident lights, to the S nodes S3 and S4 or the storage capacitors Cstr3 and Cstr4. The storage capacitors Cstr3 and Cstr4 may store charges transferred through the storage transistors SX3 and SX4, respectively. For example, a time when the storage transistor SX3 of the active pixel AP2b transfers charges generated by the photo diode PSD3 of the active pixel AP2b to the S node S3 may be identical to a time when the storage transistor SX4 of the active pixel AP3b transfers charges generated by the photo diode PSD4 of the active pixel AP3b to the S node S4.

Before a time t23, the FD node FD3 of the active pixel AP2b may be reset. At the time t23, the reset transistor RX3 may be turned off as the reset signal RG3 is deactivated and the selection transistor SLX3 may be turned on as the selection signal SEL3 is activated (i.e., the active pixel AP2b being selected). An example is illustrated in FIG. 14 as an active-to-inactive switching time t23 of the reset signal RG3 is identical to an inactive-to-active switching time t23 of the selection signal SEL2, but they may be different.

At a time t24, the transfer transistor TX3 may be turned on as the transfer signal TG3 is activated, and the transfer transistor TX3 may transfer charges, which are stored in the storage capacitor Cstr3, to the FD node FD3. In a time interval t24 to t25, a level of the detection signal DS7 output from the selection transistor SLX3 may change from level V5 to level V6 by charges of the FD node FD3 input to the second terminal (e.g., the gate) of the source follower transistor SFX3 (e.g., decrease in the case where V5>V6).

After a time t26, the FD node FD3 of the active pixel AP2b may be reset. At the time t26, the reset transistor RX3 may be turned on as the reset signal RG3 is activated and the selection transistor SLX3 may be turned off as the selection signal SEL3 is deactivated (i.e., the active pixel AP2b being not selected). An example is illustrated in FIG. 14 as an inactive-to-active switching time t26 of the reset signal RG3 is identical to an active-to-inactive switching time t26 of the selection signal SEL3, but they may be different.

Before a time t27 (including a time interval t23 to t26 of selecting the active pixel AP2b), the FD node FD4 of the active pixel AP3b may be reset. At the time t27, the reset transistor RX4 may be turned off as the reset signal RG4 is deactivated and the selection transistor SLX4 may be turned on as the selection signal SEL4 is activated (i.e., the active pixel AP3b being selected). An example is illustrated in FIG. 14 as an active-to-inactive switching time t27 of the reset signal RG4 is identical to an inactive-to-active switching time t27 of the selection signal SEL4, but they may be different.

At a time t28, the transfer transistor TX4 may be turned on as the transfer signal TG4 is activated, and the transfer transistor TX4 may transfer charges, which are generated by the photo diode PSD4 in response to a second incident light, to the FD node FD4. In a time interval t28 to t29, a level of the detection signal DS8 output from the selection transistor SLX4 may change from level V7 to level V8 by charges of the FD node FD4 input to the second terminal (e.g., the gate) of the source follower transistor SFX4 (e.g., decrease in the case where V7>V8).

After a time t30, the FD node FD4 of the active pixel AP3b may be reset. At the time t30, the reset transistor RX4 may be turned on as the reset signal RG4 is activated and the selection transistor SLX4 may be turned off as the selection signal SEL4 is deactivated (i.e., the active pixel AP3b being not selected). An example is illustrated in FIG. 14 as an inactive-to-active switching time t30 of the reset signal RG4 is identical to an active-to-inactive switching time t30 of the selection signal SEL4, but they may be different.

Figure 15:
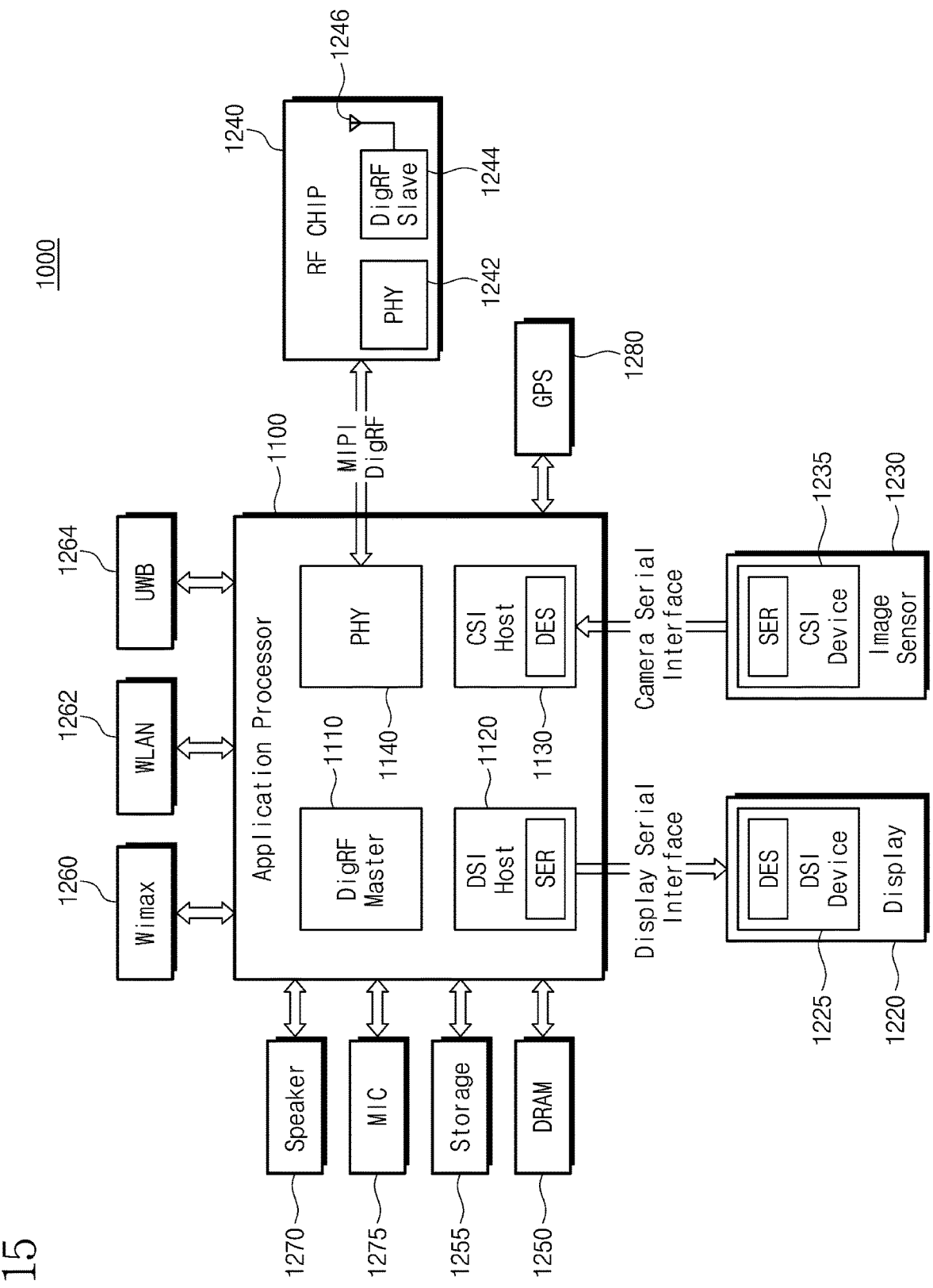
FIG. 15 is a block diagram illustrating an electronic device to which an image sensor according to an embodiment of the disclosure is applied.

FIG. 15 is a block diagram illustrating an electronic device to which an image sensor according to an embodiment of the disclosure is applied. An electronic device 1000 may be implemented with a data processing device capable of using or supporting an interface protocol proposed by mobile industry processor interface (MIPI) alliance. For example, the electronic device 1000 may be one of electronic devices such as a portable communication terminal, a personal digital assistant (PDA), a portable media player (PMP), a smartphone, a tablet computer, and a wearable device.

The electronic device 1000 may include an application processor 1100, a display 1220, and an image sensor 1230. The application processor 1100 may include a DigRF master 1110, a display serial interface (DSI) host 1120, a camera serial interface (CSI) host 1130, and a physical layer 1140. The application processor 1100 may control overall operations of the image sensor 1230.

The DSI host 1120 may communicate with a DSI device 1225 of the display 1220 in compliance with the DSI. For example, a serializer SER may be implemented in the DSI host 1120. For example, a deserializer DES may be implemented in the DSI device 1225.

The CSI host 1130 may communicate with a CSI device 1235 of the image sensor 1230 through the CSI. For example, a deserializer DES may be implemented in the CSI host 1130, and a serializer SER may be implemented in the CSI device 1235.

The image sensor 1230 may include at least one of the image sensor 100 of FIG. 1, the image sensor 200 of FIG. 2, the image sensor 300 of FIG. 3, the image sensor 400 of FIG. 4, and the image sensor 500 of FIG. 9. The image sensor 1230 may generate pixel data in which a noise between pixels and a power (or ground) noise are compensated for.

The display 2220 may include the DSI device 1225. The display 1220 may output an image based on the pixel data output from the image sensor 1230. Accordingly, the image sensor 1220 may output an image that is affected little by a noise between pixels and a power (or ground) noise.

The electronic device 1000 may further include a radio frequency (RF) chip 1240 that communicates with the application processor 1100. The RF chip 1240 may include a physical layer 1242, a DigRF slave 1244, and an antenna 1246. For example, the physical layer 1242 of the RF chip 1240 and the physical layer 1140 of the application processor 1100 may exchange data with each other through DigRF interface proposed by the MIPI alliance.

The electronic device 1000 may further include a dynamic random access memory (DRAM) 1250 and storage 1255. The DRAM 1250 and the storage 1255 may store data received from the application processor 1100. Also, the DRAM 1250 and the storage 1255 may provide the stored data to the application processor 1100. The DRAM 1250 and the storage 1255 may store information about signals received from the image sensor 1230.

The electronic device 1000 may communicate with an external device/system through communication modules, such as a worldwide interoperability for microwave access (WiMAX) 1260, a wireless local area network (WLAN) 1262, and an ultra-wideband (UWB) 1264. The electronic device 1000 may further include a speaker 1270 and a microphone 1275, which are used to process voice information. The electronic device 1000 may further include a global positioning system (GPS) device 1280 for processing position information.

An image sensor according to an embodiment of the disclosure may reduce a coupling noise occurring between pixels, and a power noise or a ground noise occurring in an analog-to-digital converter.

While the disclosure has been described with reference to exemplary embodiments thereof, it will be apparent to those of ordinary skill in the art that various changes and modifications may be made thereto without departing from the spirit and scope of the disclosure as set forth in the following claims.

What is claimed is:

1. An image sensor comprising:
   a pixel array comprising:
      a common monitor output line,
      a first monitoring pixel configured to output a first monitoring signal,
      a second monitoring pixel configured to output a second monitoring signal, and
      an active pixel configured to output a detection signal based on an incident light;
   a binning circuit configured to:
      receive the first and second monitoring signals through the common monitor output line,
      bin the first and second monitoring signals, and
      generate, based on the binned first and second monitoring signals, a first average monitoring signal;
   an analog-to-digital converter configured to:
      perform an analog-to-digital conversion based on an alternating current (AC) component of the first average monitoring signal.

2. The image sensor of claim 1, wherein the pixel array further comprises:
   a first row line connected to the first and second monitoring pixels; and
   a second row line connected to the active pixel.

3. The image sensor of claim 1, wherein the pixel array further comprises:
   a first row line connected to the first monitoring pixel;
   a second row line connected to the second monitoring pixel; and
   a third row line connected to the active pixel.

4. The image sensor of claim 1, wherein the active pixel, the first monitoring pixel, and the second monitoring pixel are configured to simultaneously output the detection signal, the first monitoring signal, and the second monitoring signal, respectively.

5. The image sensor of claim 1, wherein the analog-to-digital converter comprises a sampling capacitor configured to sample the AC component.

6. The image sensor of claim 1, wherein the pixel array further comprises:
   a first switch configured to connect the first monitoring pixel and the common monitor output line; and
   a second switch configured to connect the second monitoring pixel and the common monitor output line.

7. The image sensor of claim 6, wherein the pixel array further comprises:
   a third monitoring pixel configured to output a third monitoring signal; and
   a third switch configured to connect the third monitoring pixel and the common monitor output line,
   wherein the binning circuit is further configured to:
      receive the third monitoring signal through the common monitor output line,
      bin the third monitoring signal, and
      generate a second average monitoring signal based on the first, second and third monitoring signals, and
   the analog-to-digital converter is further configured to detect a second AC component of the second average monitoring signal.

8. An image sensor comprising:
a pixel array comprising:
  a common monitor output line,
  a plurality of monitoring pixels configured to output monitoring signals through the common monitor output line, and
  a plurality of active pixels;
a binning circuit configured to:
  receive the monitoring signals through the common monitor output line,
  bin the monitoring signals, and
  generate, based on the binned monitoring signals, an average monitoring signal;
an analog-to-digital converter comprising:
  a ramp signal generator,
  a ramp buffer,
  a correlated double sampling circuit, and
  a pixel bias circuit,
  wherein the analog-to-digital converter is configured to:
    perform an analog-to-digital conversion based on an alternating current (AC) component of the average monitoring signal, and
    provide, under control of a control circuit, the AC component to at least one of the ramp signal generator, the ramp buffer, the correlated double sampling circuit, and the pixel bias circuit; and
the control circuit configured to control the analog-to-digital converter.

9. The image sensor of claim 8, wherein the binning circuit comprises a current source, the current source connected to the plurality of monitoring pixels through the common monitor output line, and
the control circuit is further configured to control the current source so as to adjust a level of a current output from the current source.

10. The image sensor of claim 8, further comprising:
a plurality of switches, wherein the plurality of switches are connected to the plurality of monitoring pixels through the common monitor output line, respectively,
wherein the control circuit is further configured to control the plurality of switches so as to selectively connect the plurality of monitoring pixels to the common monitor output line.

11. The image sensor of claim 8,
wherein a first active pixel of the plurality of active pixels comprises:
  a first photo diode, the first photo diode is configured to generate a first charge in response to a first incident light, and
  a first transistor connected between the first photo diode and a first node, a second active pixel of the plurality of active pixels comprises:
  a second photo diode, the second photo diode configured to generate a second charge in response to a second incident light, and
  a second transistor connected between the second photo diode and a second node, the second transistor configured to transfer the second charge to the second node at a first time and
the first transistor is configured to transfer the first charge to the first node at a second time after the first time.

12. The image sensor of claim 8,
wherein a first active pixel of the plurality of active pixels comprises:
  a first photo diode, the first photo diode configured to generate a first charge in response to a first incident light, and
  a first transistor connected between the first photo diode and a first node, a second active pixel of the plurality of active pixels comprises:
  a second photo diode, the second photo diode configured to generate a second charge in response to a second incident light, and
  a second transistor connected between the second photo diode and a second node, and
the first photo diode and the second photo diode are configured such that a first time taken for the first transistor to transfer the first charge to the first node is substantially identical to a second time taken for the second transistor to transfer the second charge to the second node.

13. An image sensor comprising:
an active pixel configured to:
  detect an incident light, and
  generate a detection signal based on the detected incident light;
a plurality of monitoring pixels configured to share a common monitor output line;
a binning circuit configured to:
  receive monitoring signals from the plurality of monitoring pixels through the common monitor output line,
  bin the monitoring signals,
generate, based on the binned monitoring signals, an average monitoring signal;
a ramp signal generator configured to generate a ramp signal, wherein the ramp signal includes levels varying linearly over time;
a ramp buffer configured to generate, based on the ramp signal, a reference signal;
a pixel bias circuit configured to drive the active pixel so as to output the detection signal;
a correlated double sampling circuit configured to:
  receive the detection signal and the reference signal, and to
  generate a compensation signal by performing, based on the reference signal, correlated double sampling on the detection signal; and
a bias signal generator configured to:
  provide a first bias signal to the ramp signal generator,
  provide a second bias signal to the ramp buffer, and
  provide third and fourth bias signals to the pixel bias circuit,
wherein at least one of the ramp signal generator, the ramp buffer, and the pixel bias circuit are configured to:
  receive the average monitoring signal, and
  sample an alternating current (AC) component of the average monitoring signal.

14. The image sensor of claim 13, wherein the ramp signal generator comprises:
a first resistor including a first end connected to a first power supply voltage;
a sampling capacitor connected to the binning circuit;
a comparator comprising:
  a first input terminal configured to receive the average monitoring signal from the binning circuit through the sampling capacitor, a second input terminal connected to a second end of the first resistor, and an output terminal;

a first transistor comprising:
a first source connected to a second power supply voltage,
a first drain connected to the second input terminal of the comparator, and
a first gate connected to the output terminal of the comparator;

a first current source connected between the second power supply voltage and an output of the ramp signal;

a second resistor connected between the output of the ramp signal and the first power supply voltage; and a second transistor comprising:
a second source connected to the second power supply voltage,
a second drain connected to the output of the ramp signal, and
a second gate connected to the output terminal of the comparator.

15. The image sensor of claim 14, wherein the ramp signal generator further comprises a sampling switch configured to electrically connect the bias signal generator and the first input terminal of the comparator, and the first input terminal of the comparator is configured to receive the first bias signal from the bias signal generator through the sampling switch.

16. The image sensor of claim 13, wherein the ramp buffer comprises:

a sampling capacitor connected to the binning circuit, a current mirror, a first transistor connected to a first terminal of the current mirror, and a second transistor connected to a second terminal of the current mirror, a first gate of the first transistor is configured to receive the average monitoring signal through the sampling capacitor, a gate of the second transistor is configured to receive the ramp signal from the ramp signal generator, and a source of the second transistor is configured to output the reference signal.

17. The image sensor of claim 16, wherein the ramp buffer further comprises a sampling switch, and the first gate of the first transistor is further configured to receive the second bias signal from the bias signal generator through the sampling switch.

18. The image sensor of claim 13, wherein the pixel bias circuit comprises:

a first sampling capacitor connected to the binning circuit; and a first transistor, the first transistor comprising:
a source connected to a first power supply voltage,
a drain connected to an output of the active pixel, and
a first gate configured to receive the average monitoring signal from the binning circuit through the first sampling capacitor.

19. The image sensor of claim 18, wherein the pixel bias circuit further comprises:

a second sampling capacitor connected to the first power supply voltage; and a second transistor, the second transistor connected in parallel with the first transistor and comprising a second gate, the second gate connected to the first power supply voltage through the second sampling capacitor.

20. The image sensor of claim 19, wherein the pixel bias circuit further comprises:

a first sampling switch, and a second sampling switch, wherein the first gate of the first transistor is configured to receive a third bias signal from the bias signal generator through the first sampling switch, and the second gate of the second transistor is configured to receive a fourth bias signal from the bias signal generator through the second sampling switch.

* * * * *